(12) United States Patent
Misaka

(10) Patent No.: US 6,236,516 B1
(45) Date of Patent: May 22, 2001

(54) ZOOM LENS AND OPTICAL APPARATUS HAVING THE SAME

(75) Inventor: Makoto Misaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/348,497

(22) Filed: Jul. 7, 1999

(30) Foreign Application Priority Data

Jul. 8, 1998 (JP) .................................................. 10-208594

(51) Int. Cl.$^7$ ...................................................... B02B 15/14
(52) U.S. Cl. ........................... 359/690; 359/684; 359/689
(58) Field of Search .................................. 359/690, 689, 359/684

(56) References Cited

U.S. PATENT DOCUMENTS

| | | | |
|---|---|---|---|
| 5,144,488 | 9/1992 | Endo et al. | 359/686 |
| 5,528,427 | 6/1996 | Tanaka et al. | 359/683 |
| 5,581,404 | 12/1996 | Misaka et al. | 359/557 |
| 5,627,682 * | 5/1997 | Nagaoka | 359/688 |
| 5,691,851 | 11/1997 | Nishio et al. | 359/683 |
| 5,815,320 | 9/1998 | Hoshi et al. | 359/686 |
| 5,831,772 | 11/1998 | Nishio et al. | 359/689 |
| 5,859,729 | 1/1999 | Misaka | 359/686 |

FOREIGN PATENT DOCUMENTS

| | | |
|---|---|---|
| 3-228008 | 10/1991 | (JP) . |
| 5-119260 | 5/1993 | (JP) . |
| 6-230285 | 8/1994 | (JP) . |

\* cited by examiner

*Primary Examiner*—Georgia Epps
*Assistant Examiner*—Timothy Thompson
(74) *Attorney, Agent, or Firm*—Fitzpatrick, Cella, Harper & Scinto

(57) ABSTRACT

A zoom lens includes, in order from a longer conjugate side to a shorter conjugate side, a first lens unit of positive refractive power, a second lens unit of negative refractive power, and a succeeding lens group which is composed of a plurality of lens units or one lens unit and whose overall refractive power is positive, wherein, during zooming from a wide-angle end to a telephoto end, the separation between the first lens unit and the second lens unit increases and the separation between the second lens unit and the succeeding lens group decreases, and wherein the second lens unit includes a front lens subunit of negative refractive power and a rear lens subunit of negative refractive power disposed on the shorter conjugate side of the front lens subunit, focusing being formed by moving the rear lens subunit, and the following condition being satisfied:

$$0.3 < |f2a|/\sqrt{(fw \times ft)} < 0.9$$

where fw and ft are focal lengths at the wide-angle end and the telephoto end of the zoom lens, respectively, and f2a is a focal length of the front lens subunit.

7 Claims, 14 Drawing Sheets

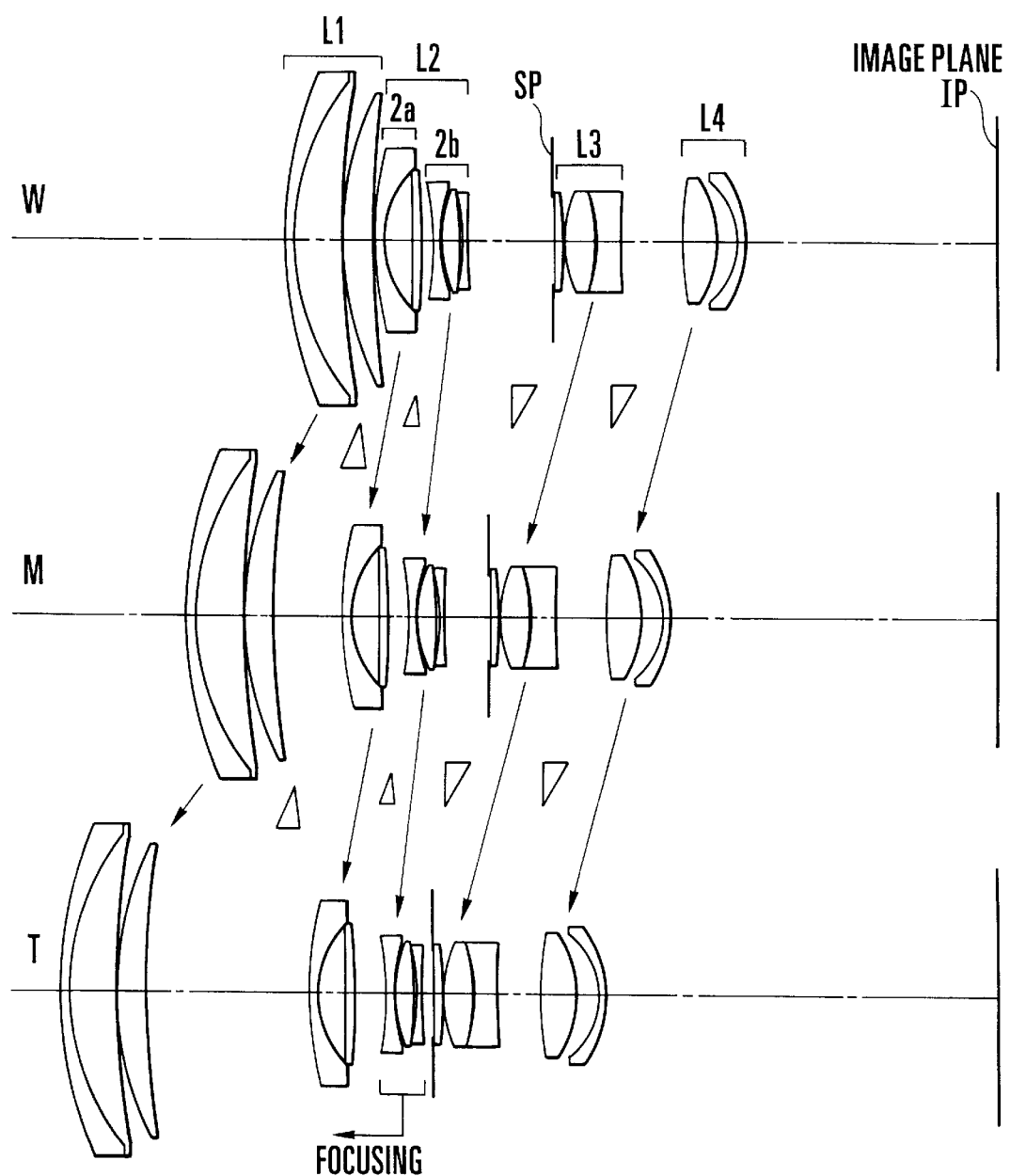

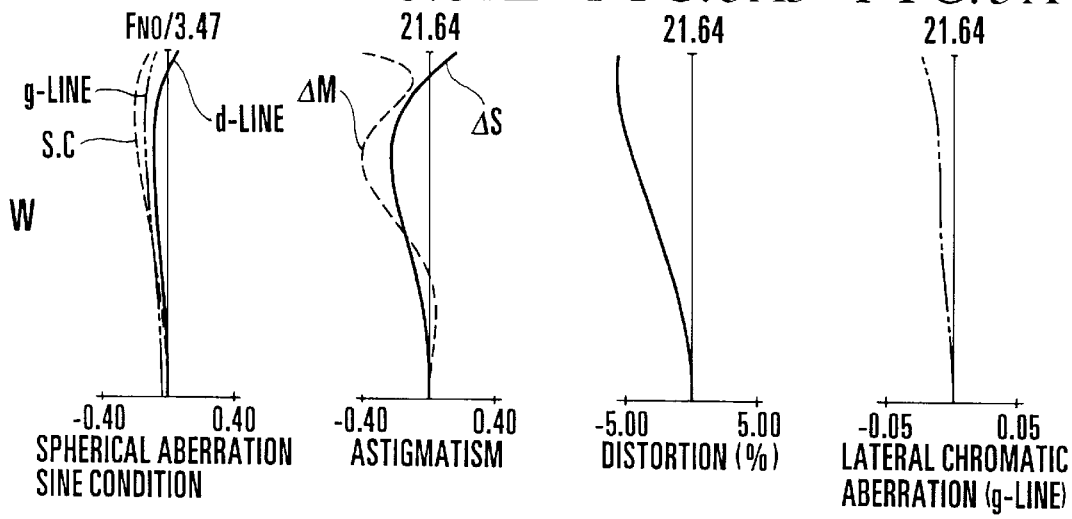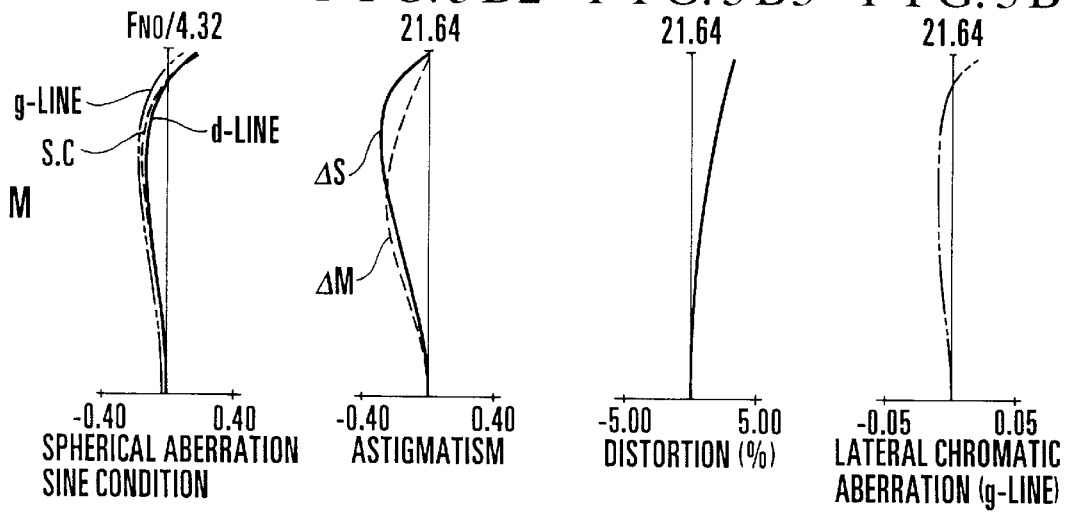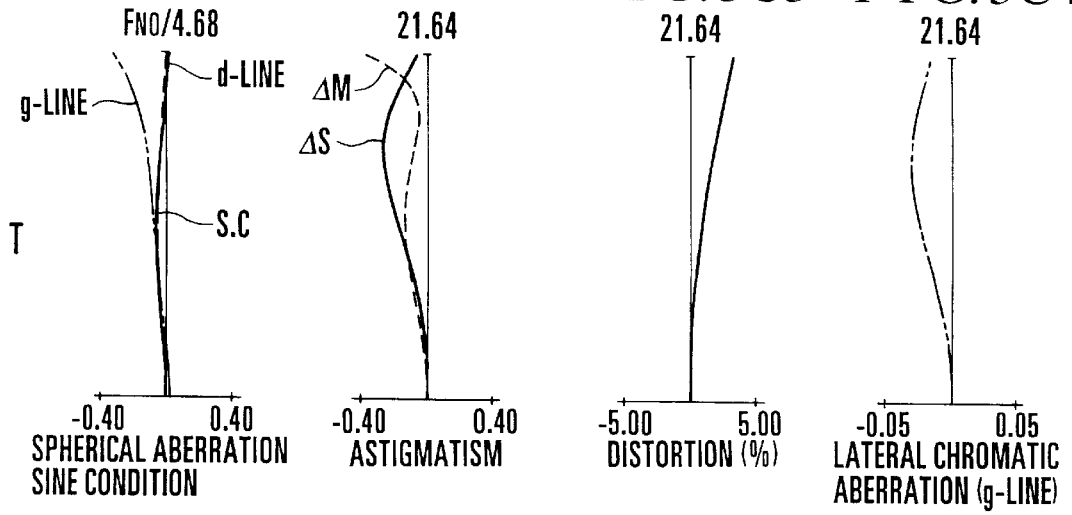

FIG.6A1
FNO/3.51

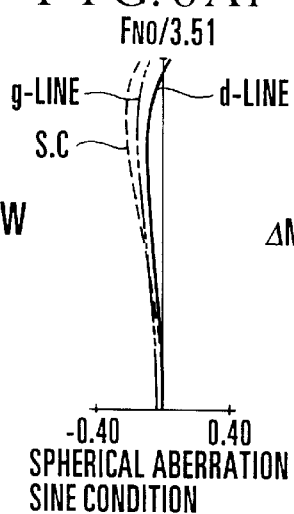
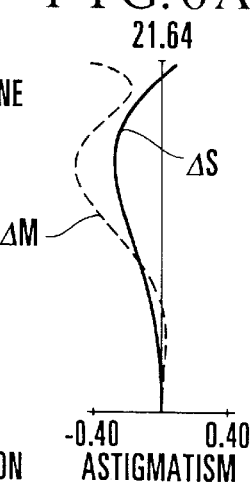
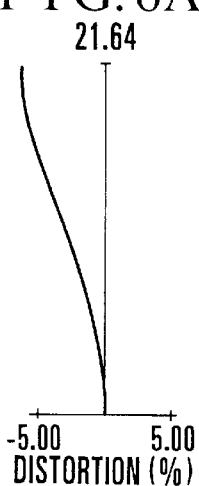
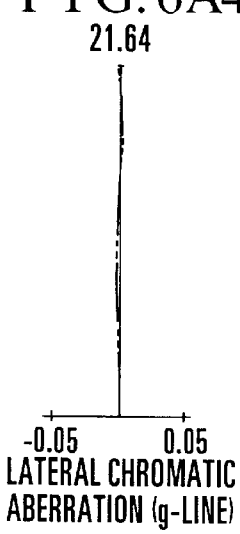

-0.40  0.40
SPHERICAL ABERRATION
SINE CONDITION

-0.40  0.40
ASTIGMATISM

-5.00  5.00
DISTORTION (%)

-0.05  0.05
LATERAL CHROMATIC
ABERRATION (g-LINE)

FIG.6B1
FNO/4.32

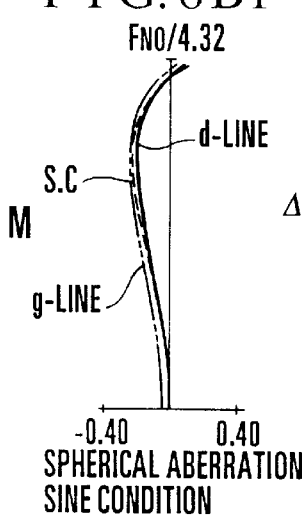
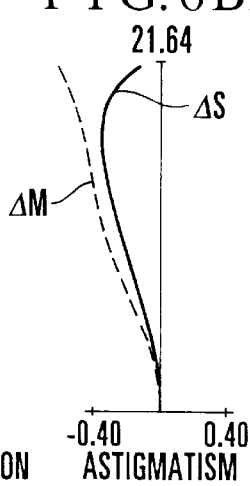
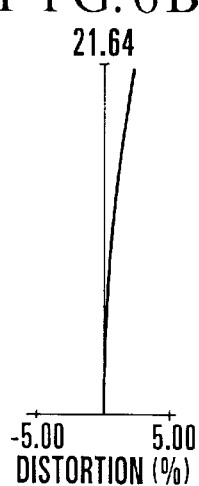
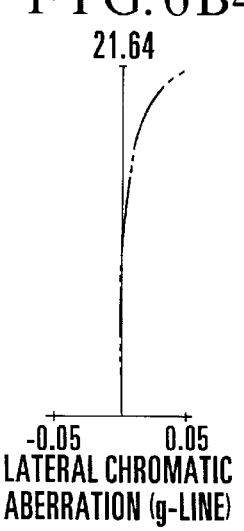

-0.40  0.40
SPHERICAL ABERRATION
SINE CONDITION

-0.40  0.40
ASTIGMATISM

-5.00  5.00
DISTORTION (%)

-0.05  0.05
LATERAL CHROMATIC
ABERRATION (g-LINE)

FIG.6C1
FNO/4.50

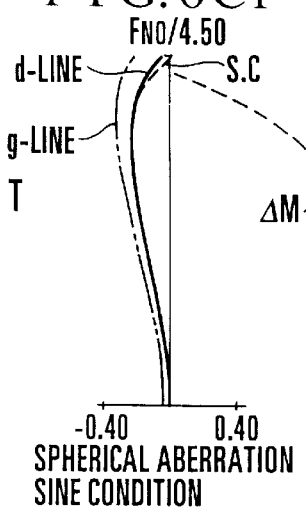
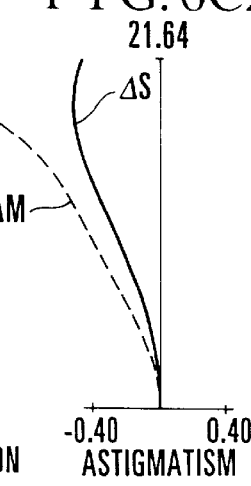
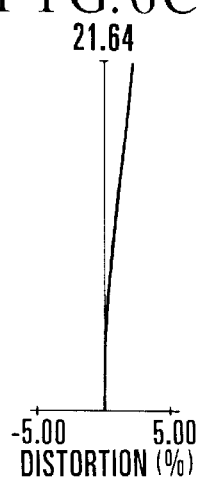
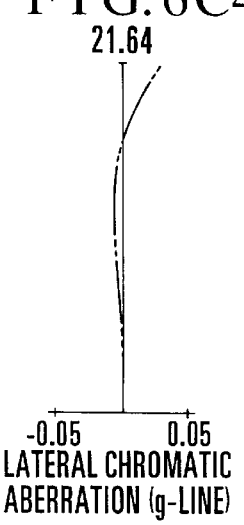

-0.40  0.40
SPHERICAL ABERRATION
SINE CONDITION

-0.40  0.40
ASTIGMATISM

-5.00  5.00
DISTORTION (%)

-0.05  0.05
LATERAL CHROMATIC
ABERRATION (g-LINE)

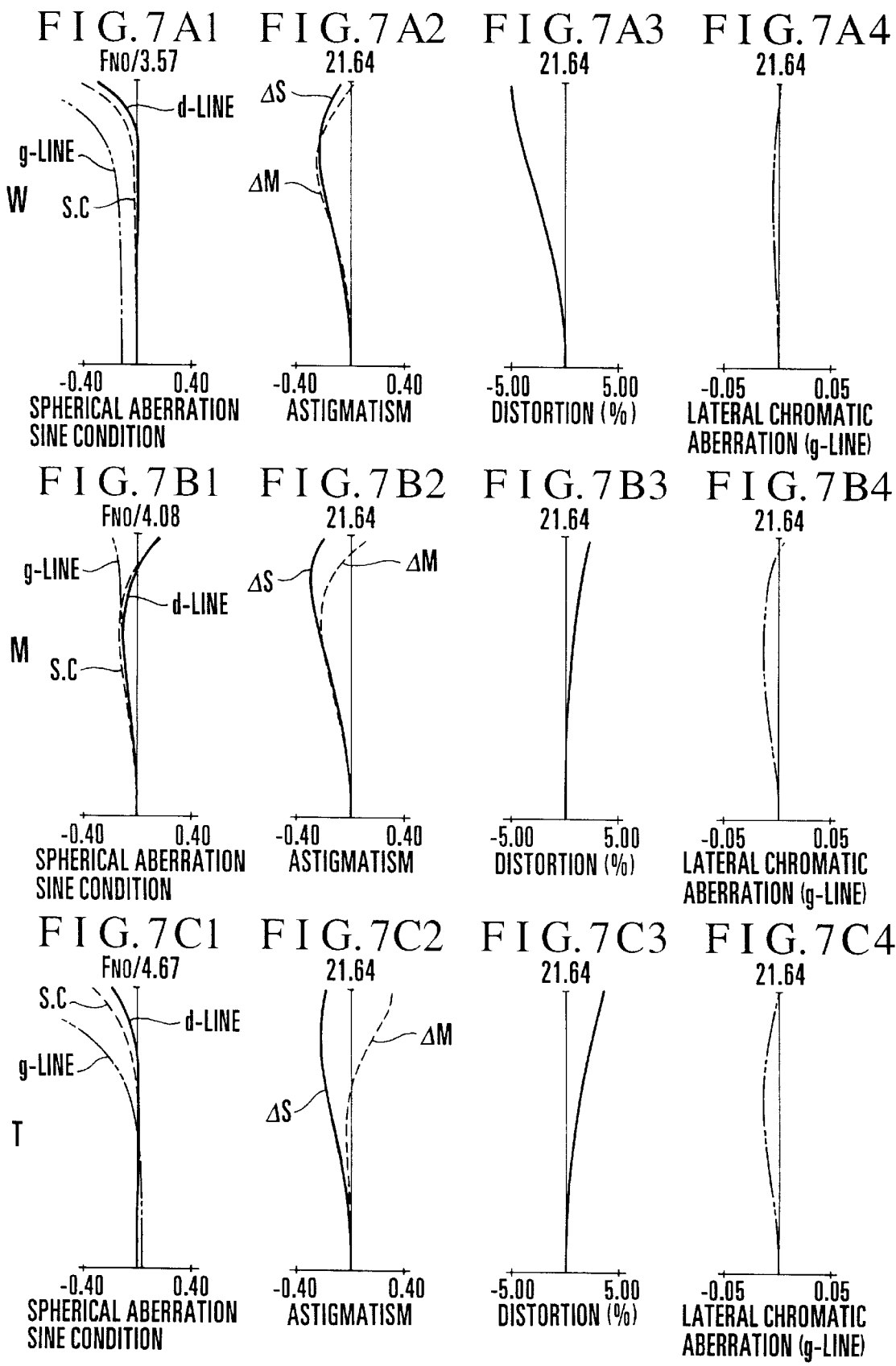

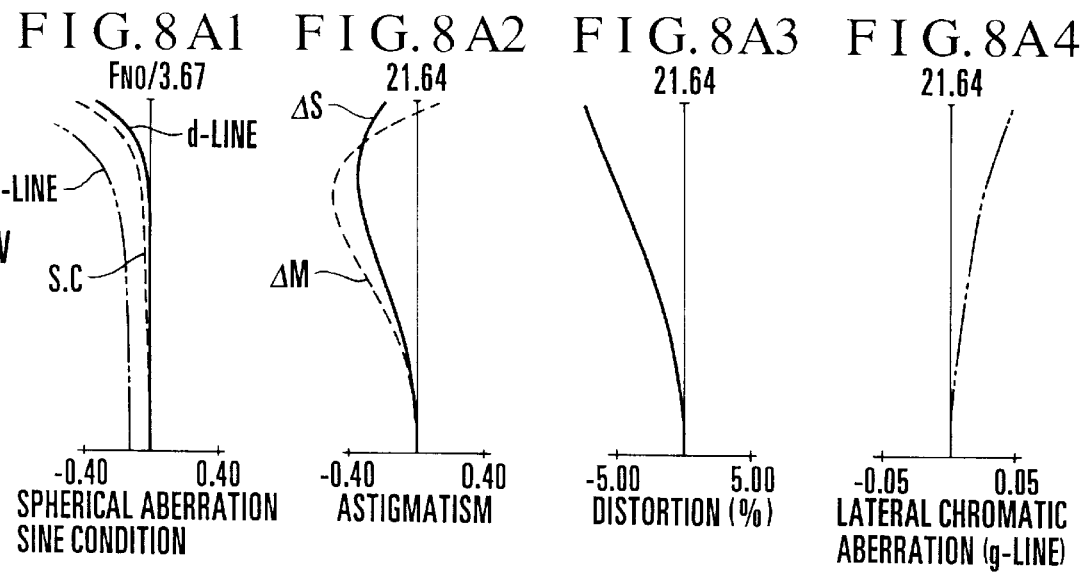
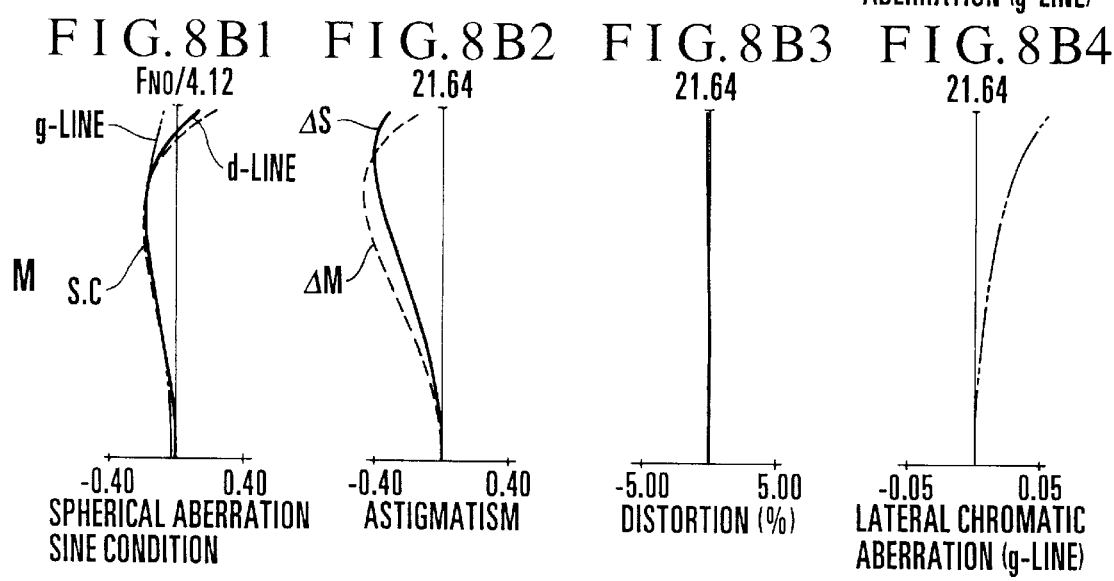
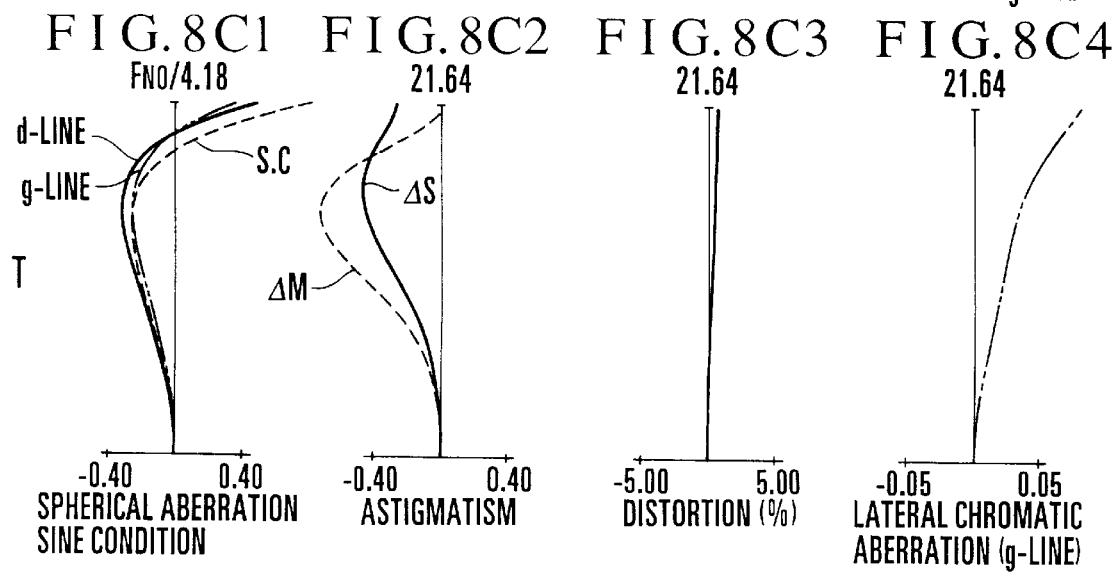

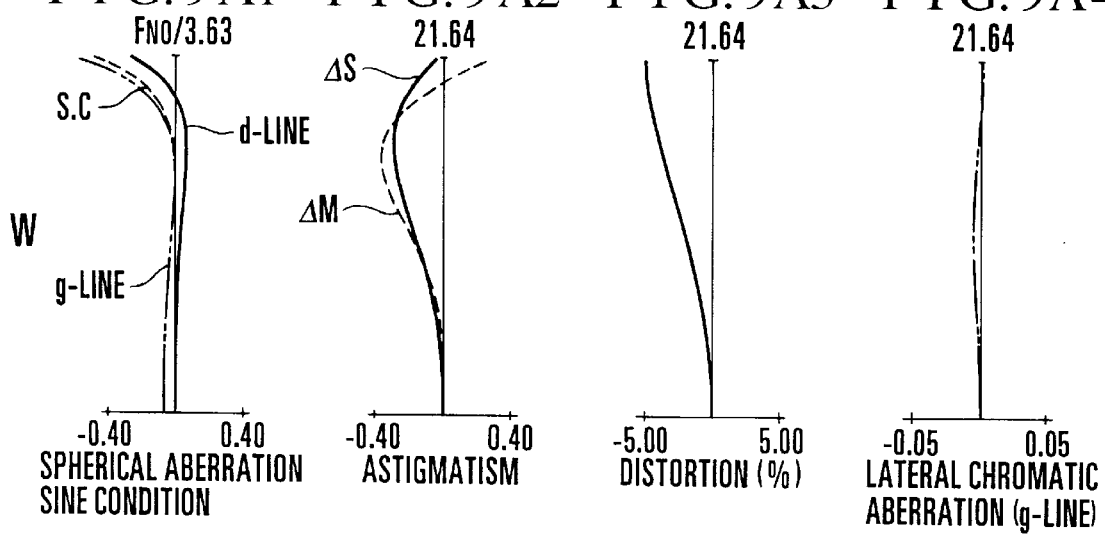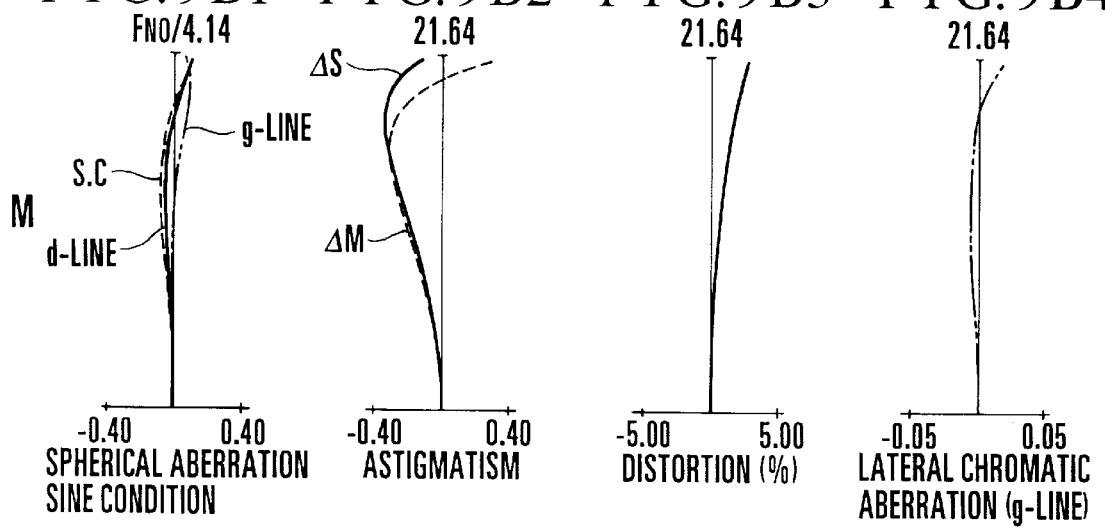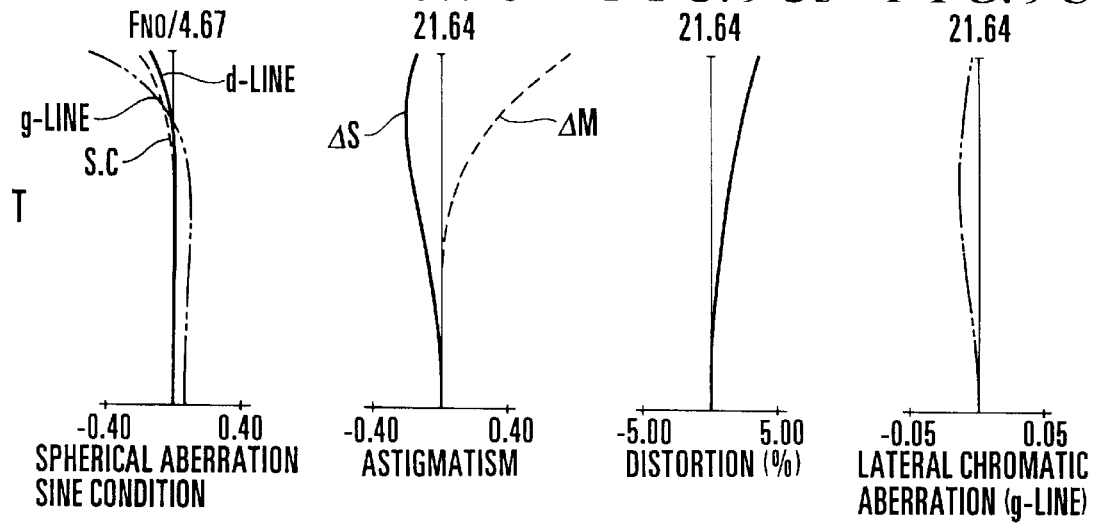

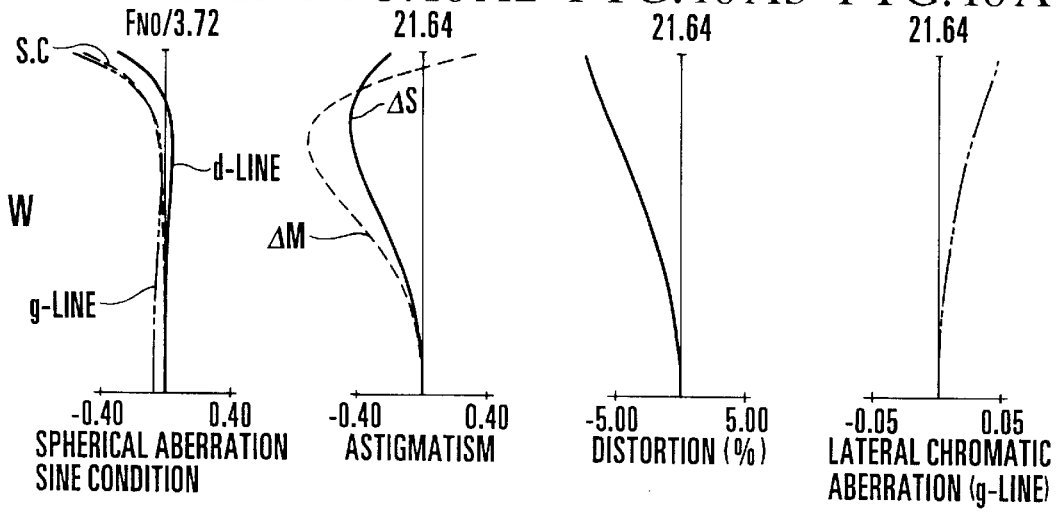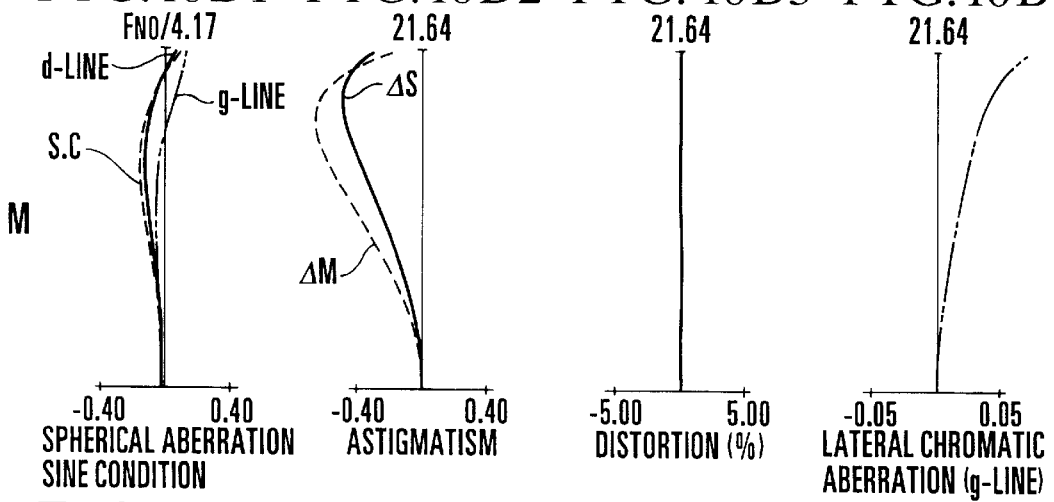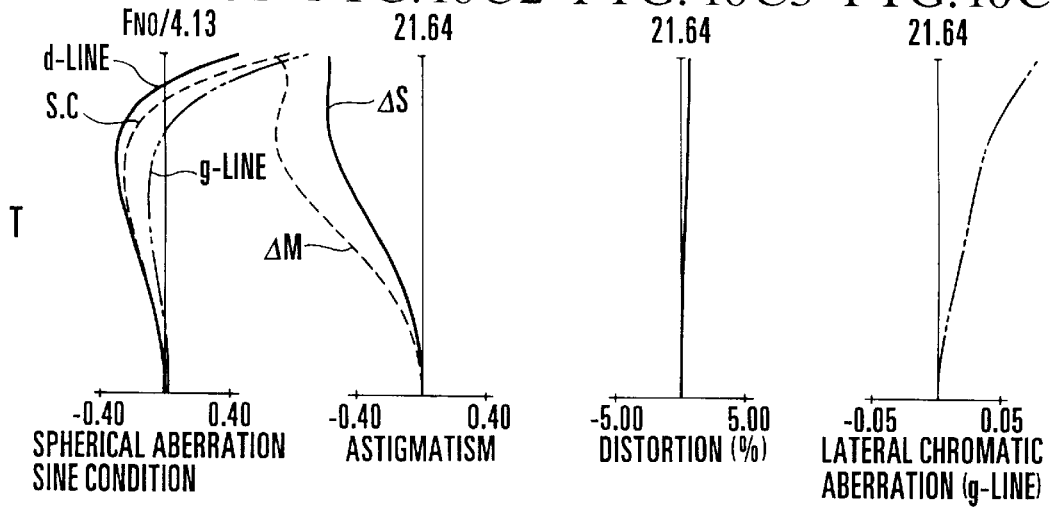

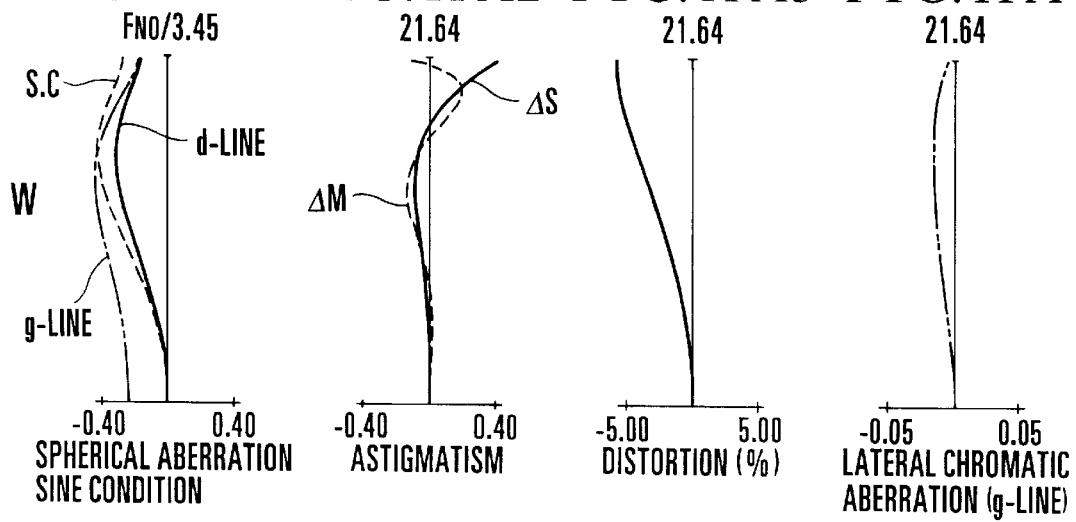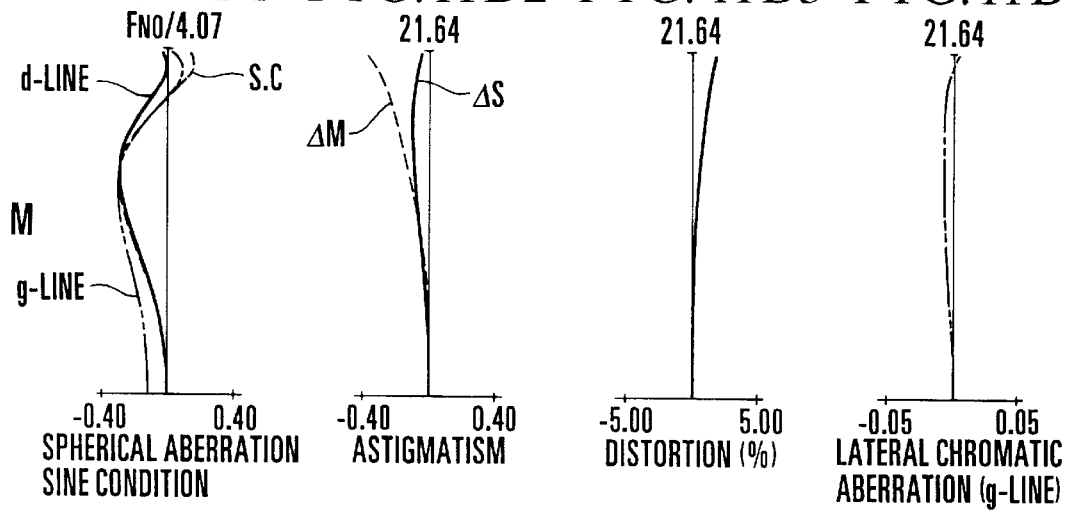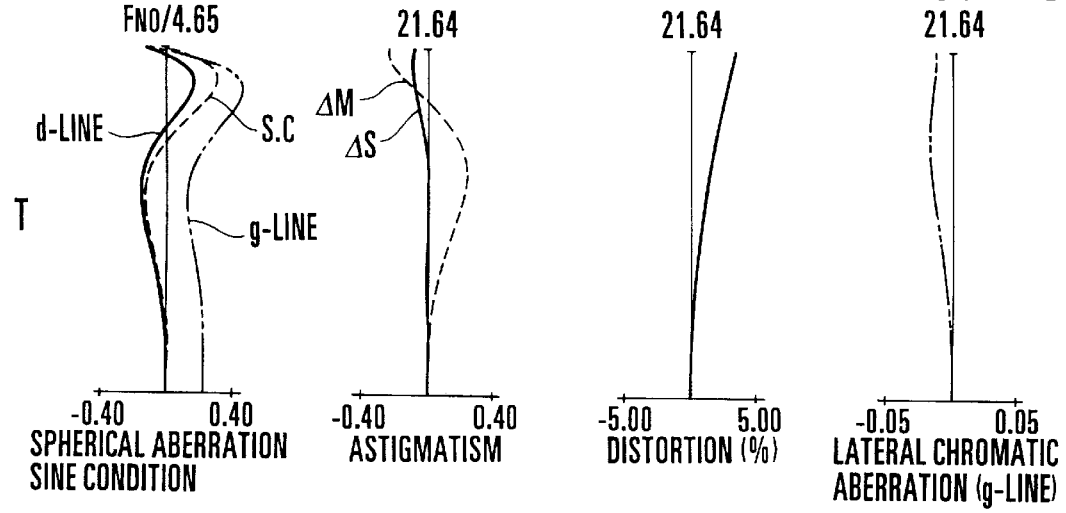

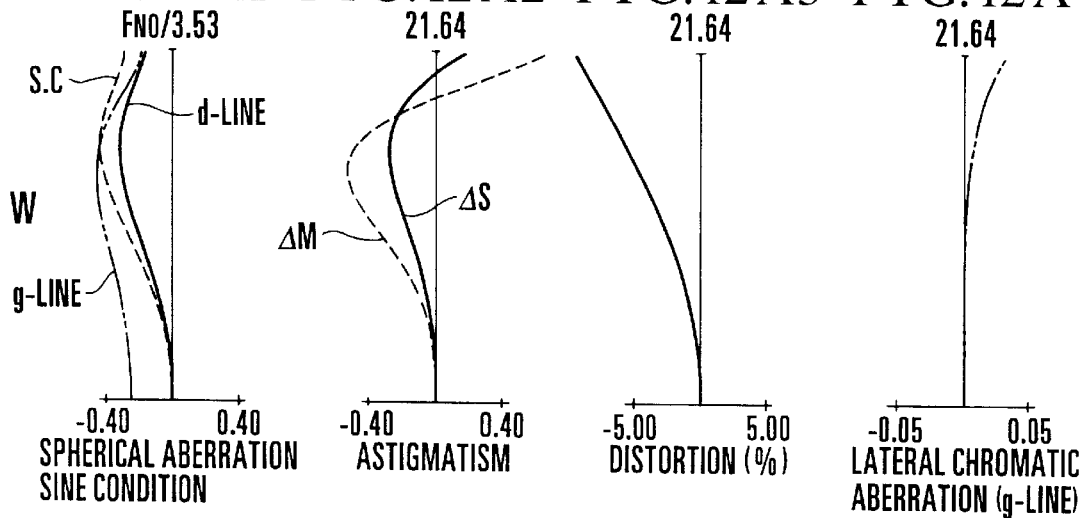
FIG.12A1  FIG.12A2  FIG.12A3  FIG.12A4
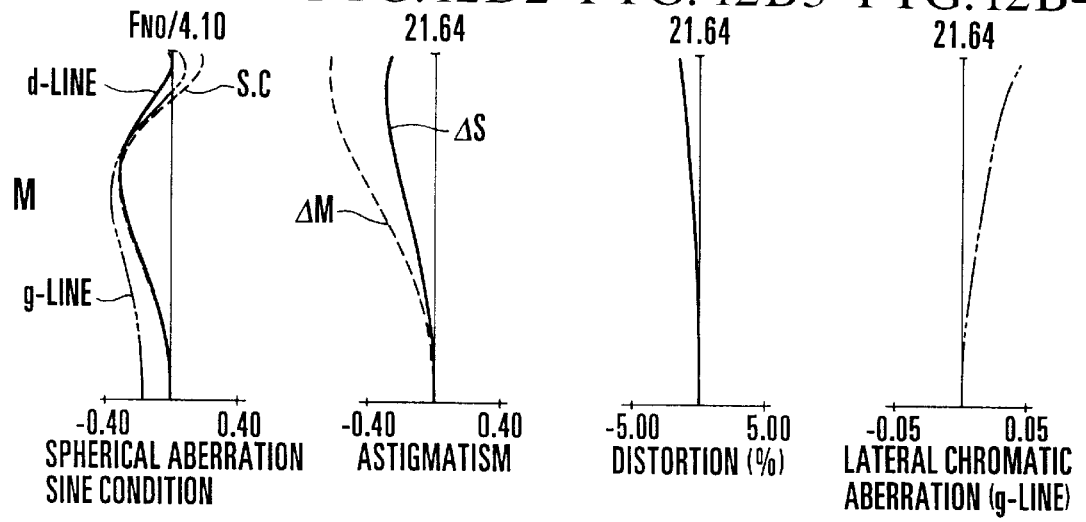
FIG.12B1  FIG.12B2  FIG.12B3  FIG.12B4
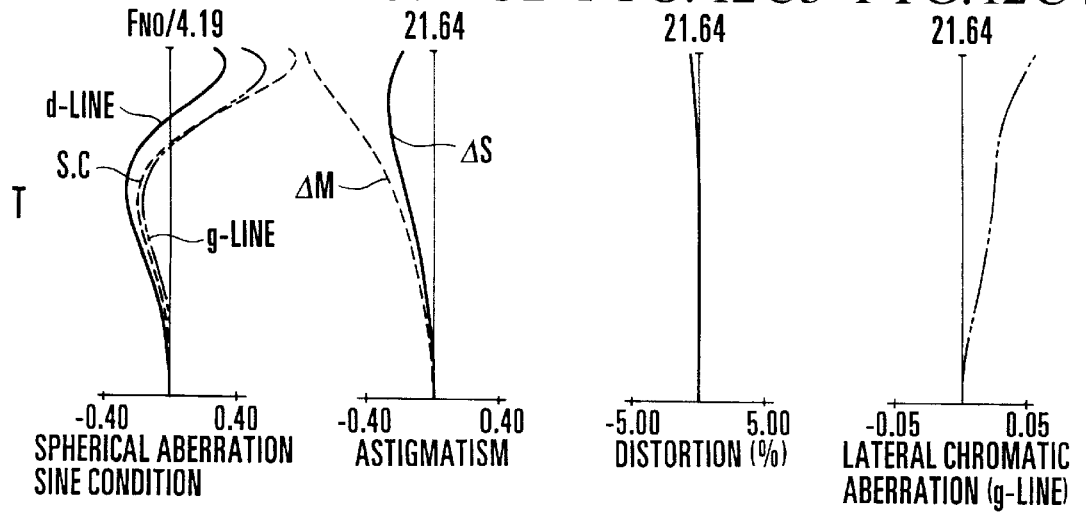
FIG.12C1  FIG.12C2  FIG.12C3  FIG.12C4

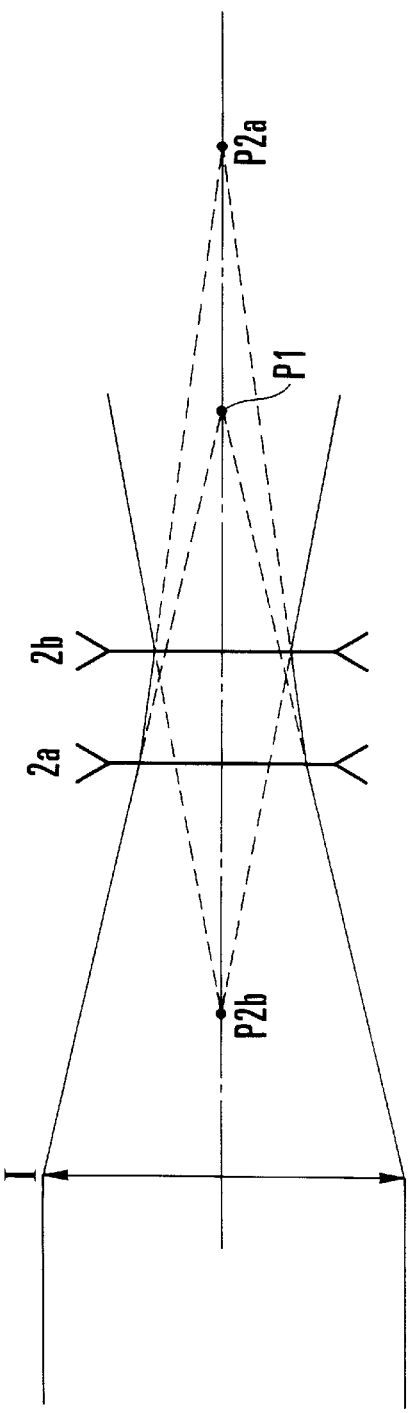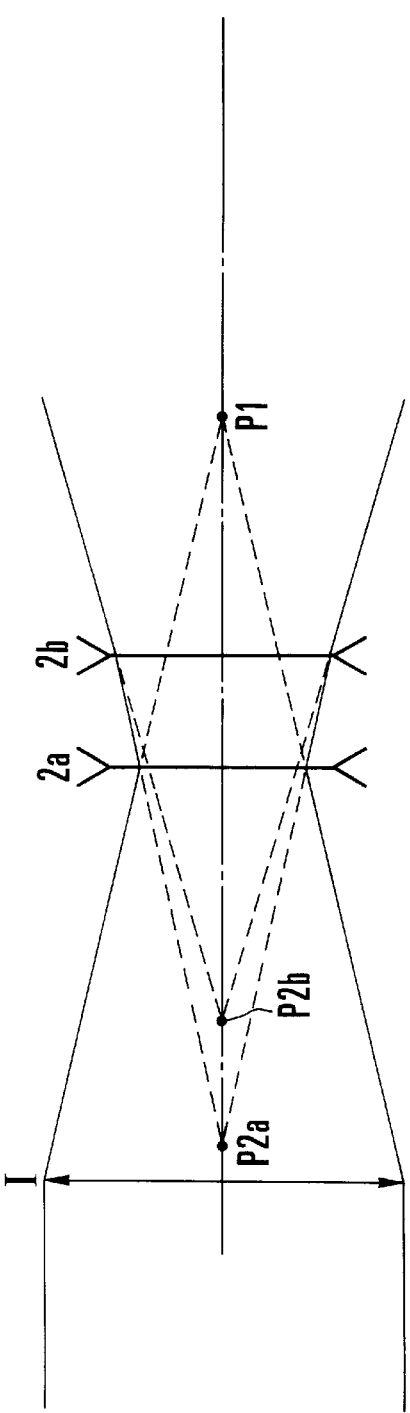
F I G. 13A WHEN MAGNIFICATION OF FRONT LENS SUBUNIT 2a IS POSITIVE
F I G. 13B WHEN MAGNIFICATION OF FRONT LENS SUBUNIT 2a IS NEGATIVE

ZOOM LENS AND OPTICAL APPARATUS HAVING THE SAME

BACKGROUND OF THE INVENTION

1. Field of the Invention

The present invention relates to a zoom lens and an optical apparatus having the same and, more particularly, to a zoom lens of a high magnification range suited to be used in single-lens reflex cameras or video cameras.

2. Description of Related Art

For zoom lenses, there have been known a focusing method of moving the first lens unit, or the so-called "front focus" method, and another focusing method of moving the second or later lens unit, or the so-called "inner focus" or "rear focus" method.

In general, the zoom lenses of the inner or rear focus type have their first lens units made smaller in diameter to admit of the effective light beam, than when the front focus type is in use. So, there is an advantage of assuring improvements of the compact form of the entire lens system. Moreover, the focusing lens unit is relatively small in size and light in weight. So, particularly for the auto-focus cameras that have recently become the main stream of development, fast focusing becomes possible to perform. Even this constitutes a characteristic feature of the inner or rear focus type zoom lens.

As one of the zoom lenses of such inner or rear focus type, mention may be made of the zoom lens that comprises, in order from an object side, a positive first lens unit, a negative second lens unit and succeeding lens units whose overall power is positive. All the separations between the adjacent lens units are made to vary to effect zooming. In this so-called "positive lead" type of zoom lens, the second lens unit of negative refractive power is used for focusing purposes, as disclosed in, for example, Japanese Laid-Open Patent Applications No. Hei 3-228008 (corresponding to U.S. Pat. No. 5,144,488), No. Hei 5-119260 (corresponding to U.S. Pat. No. 5,528,427), and No. Hei 6-230285.

This method, particularly when applied to the high range zoom lens including the standard region, not only brings the above-described features into full play, but also maintains good stability of optical performance throughout the entire focusing range from an infinitely distant object to a closest object.

Here, for the positive lead type of zoom lens, an explanation is made about the variation of magnification of the negative second lens unit during zooming of the entire zoom lens.

In general, the negative second lens unit has a negative fractional magnification at the wide-angle end and, as zooming advances to the telephoto end, the absolute value of the magnification increases. Moreover, since the second lens unit is the main variator of the positive lead type zoom lens, the magnification of the second lens unit increases by a large amount (or changes in such a direction as to approach "−1" from the negative fractional magnification) during zooming of the entire zoom lens from the wide-angle end to the telephoto end. Particularly in the case of the high range zoom lens, such an increase becomes conspicuous.

Now, the relationship between the magnification of the focusing lens unit and the focusing sensitivity (the ratio of the amount of shift of the focal plane to the amount of movement of the focusing lens unit) can be expressed by the following formula:

$$ES = (1 - \beta f^2) \times \beta r^2$$

where
ES: the focusing sensitivity,
βf: the magnification of the focusing lens unit, and
βr: the combined magnification of all the lens units disposed on the image side of the focusing lens unit.

It is understandable from the formula described above that, when the absolute value of magnification of the focusing lens unit is "1", the focusing sensitivity takes a value of "0", and as the absolute value of magnification of the focusing lens unit departs from "1", the focusing sensitivity becomes greater.

In the positive lead type of zoom lens, however, as described before, the magnification of the negative second lens unit varies in a direction from the negative fractional magnification to "−1" during zooming of the entire zoom lens from the wide-angle end to the telephoto end. For this reason, when shooting a close object with a zoom lens of high range, the focusing sensitivity of the negative second lens unit becomes small at or near the telephoto end, so that the total focusing movement is remarkably increased. Further, in a case where the magnification of the negative second lens unit takes a value of "−1" in a middle way of zooming, the focusing sensitivity becomes "0", so that it happens that the focusing becomes impossible.

BRIEF SUMMARY OF THE INVENTION

The present invention has been made to solve the problems described above. It is, therefore, an object of the invention to provide a zoom lens of compact form arranged such that even if the zoom lens has a high range, the required amount for a certain focusing range of movement of the focusing lens unit is prevented from extremely increasing.

To attain the above object, in accordance with an aspect of the invention, there is provided a zoom lens comprising, in order from a longer conjugate side to a shorter conjugate side, a first lens unit of positive refractive power, a second lens unit of negative refractive power, and a succeeding lens group that is composed of a plurality of lens units or one lens unit and whose overall refractive power is positive, wherein, during zooming from a wide-angle end to a telephoto end, the separation between the first lens unit and the second lens unit increases and the separation between the second lens unit and the succeeding lens group decreases, and wherein the second lens unit includes a front lens subunit of negative refractive power and a rear lens subunit of negative refractive power disposed on the shorter conjugate side of the front lens subunit, focusing being performed by moving the rear lens subunit, and the following condition being satisfied:

$$0.3 < |f2a|/\sqrt{(fw \times ft)} < 0.9$$

where fw and ft are focal lengths at the wide-angle end and the telephoto end of the zoom lens, respectively, and f2a is a focal length of the front lens subunit.

Another object of the invention is to provide an optical apparatus having the zoom lens of the invention described above.

The above and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIG. 4 is a longitudinal section view of a numerical example 4 of the zoom lens of the invention in three operative positions.

FIGS. 5A1 to 5A4, 5B1 to 5B4 and 5C1 to 5C4 are graphic representations of the aberrations of the numerical example 1 of the zoom lens of the invention with an object at an infinity distance.

FIGS. 6A1 to 6A4, 6B1 to 6B4 and 6C1 to 6C4 are graphic representations of the aberrations of the numerical example 1 of the zoom lens of the invention with an object at a distance of 1 meter.

FIGS. 7A1 to 7A4, 7B1 to 7B4 and 7C1 to 7C4 are graphic representations of the aberrations of the numerical example 2 of the zoom lens of the invention with an object at an infinity distance.

FIGS. 8A1 to 8A4, 8B1 to 8B4 and 8C1 to 8C4 are graphic representations of the aberrations of the numerical example 2 of the zoom lens of the invention with an object at a distance of 0.5 meters.

FIGS. 9A1 to 9A4, 9B1 to 9B4 and 9C1 to 9C4 are graphic representations of the aberrations of the numerical example 3 of the zoom lens of the invention with an object at an infinity distance.

FIGS. 10A1 to 10A4, 10B1 to 10B4 and 10C1 to 10C4 are graphic representations of the aberrations of the numerical example 3 of the zoom lens of the invention with an object at a distance of 0.5 meters.

FIGS. 11A1 to 11A4, 11B1 to 11B4 and 11C1 to 11C4 are graphic representations of the aberrations of the numerical example 4 of the zoom lens of the invention with an object at an infinity distance.

FIGS. 12A1 to 12A4, 12B1 to 12B4 and 12C1 to 12C4 are graphic representations of the aberrations of the numerical example 4 of the zoom lens of the invention with an object at a distance of 0.5 meters.

FIGS. 13A and 13B are diagrams of geometry for explaining the principle of the zoom lens of the invention.

DETAILED DESCRIPTION OF THE INVENTION

Figure 1:
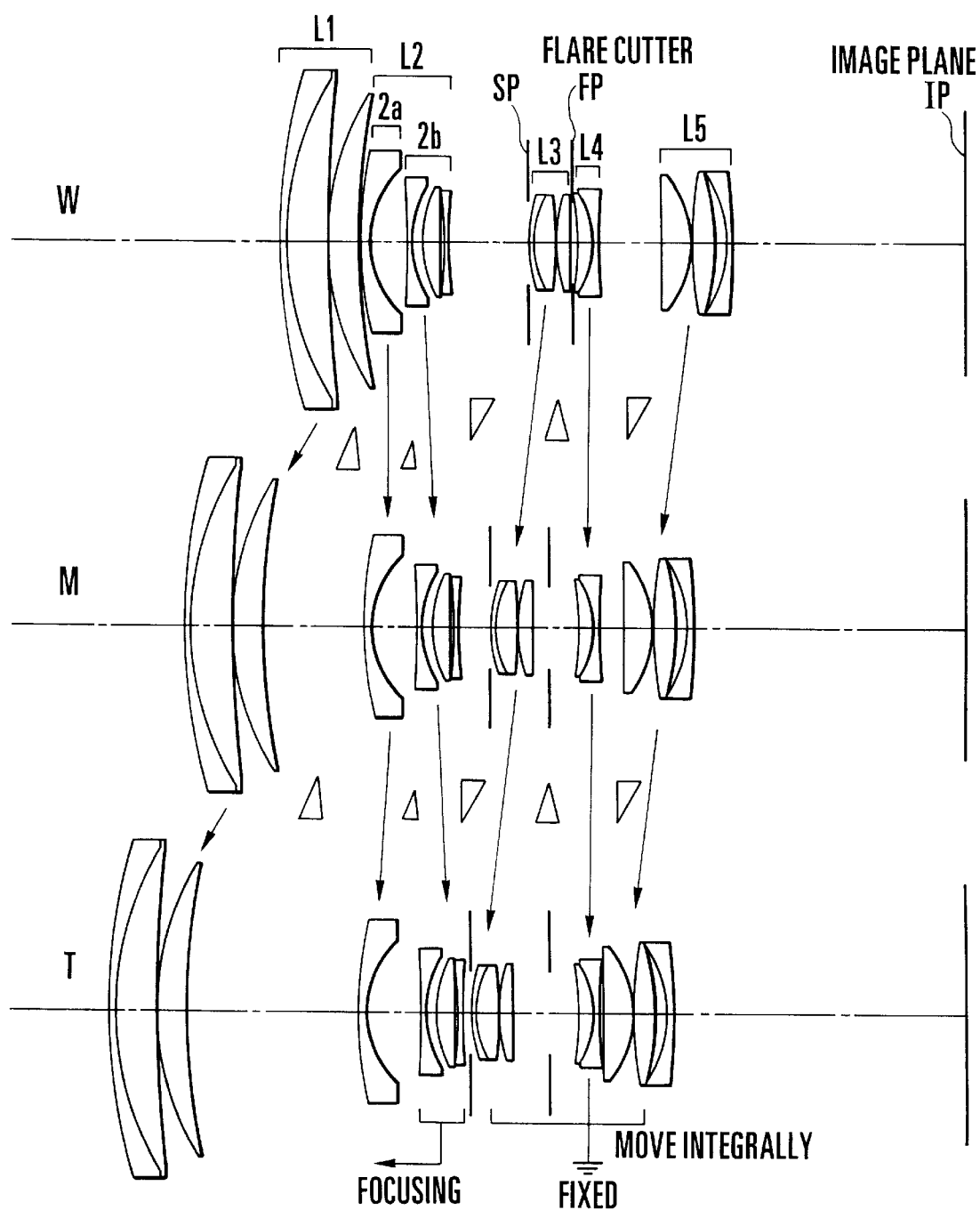
FIG. 1 is a longitudinal section view of a numerical example 1 of the zoom lens of the invention in three operative positions.

Hereinafter, preferred embodiments of the invention will be described in detail with reference to the drawings.

As described in the foregoing, in the positive lead type of zoom lens, the use of the negative second lens unit in focusing gives rise to a problem that, when the magnification of the second lens unit takes a value of "−1" or a value near "−1", focusing becomes impossible or a focusing movement remarkably increases.

In the zoom lens of the invention, the negative second lens unit is divided into at least a negative front lens subunit $2a$ and a negative rear lens subunit $2b$, and focusing is performed by moving the rear lens subunit $2b$ disposed on the shorter conjugate side of the front lens subunit $2a$. This division results in separation of the negative refractive power of the second lens unit into at least two fractions. Therefore, the negative refractive power of a focusing lens becomes smaller than when focusing is performed by moving the second lens unit as a whole. So, at first sight, it seems that the focusing sensitivity becomes even smaller. In fact, however, an arrangement is made that the focusing sensitivity becomes greater. In the following, this principle is explained by using FIGS. 13A and 13B.

As shown in FIGS. 13A and 13B, the first lens unit forms an image at a point P1. The point P1 is an image point of the first lens unit and, at the same time, is an object point for the front lens subunit $2a$. The front lens subunit $2a$ forms an image at a point P2$a$. Further, the image point P2$a$ of the front lens subunit $2a$ is at the same time an object point for the rear lens subunit $2b$. The rear lens subunit $2b$ forms an image at a point P2$b$. The point P2$b$ is an image point of not only the rear lens subunit $2b$ but also the second lens unit as a whole.

When, as shown in FIG. 13A, the magnification of the front lens subunit $2a$ is positive (when the object point P1 and the image point P2$a$ of the front lens subunit $2a$ lie in the same direction as viewed from the front lens subunit $2a$), because the front lens subunit $2a$ is of a negative refractive power, the point P2$a$ takes its place on the image side of the point P1. Since the image point of the whole second lens unit and the image point of the rear lens subunit $2b$ lie at one and the same point P2$b$, on comparison of the whole second lens unit and the rear lens subunit $2b$, it is found that the rear lens subunit $2b$ whose object point lies farther has its absolute value of magnification becoming smaller. Because the magnification of the whole second lens unit is negative, the rear lens subunit $2b$ has its magnification shifted from the magnification of the whole second lens unit in the positive direction.

Conversely, when, as shown in FIG. 13B, the magnification of the front lens subunit $2a$ is negative (when the object point P1 and the image point P2$a$ of the front lens subunit $2a$ lie in opposite directions as viewed from the front lens subunit $2a$), the object point P2$a$ and the image point P2$b$ of the rear lens subunit $2b$ lie on the object side as viewed from the rear lens subunit $2b$. Therefore, the magnification of the rear lens subunit $2b$ becomes positive. Because the magnification of the whole second lens unit is negative, it is found in this case, too, that the rear lens subunit $2b$ has its magnification shifted from the magnification of the whole second lens unit in the positive direction.

Owing to the above effect, even in a case where, as in the high range zoom lens, for example, the magnification of the whole second lens unit eventually takes a value of "−1" or a value near to "−1", the focusing sensitivity of the rear lens subunit $2b$ becomes large enough, thus making it possible to perform focusing onto an object at the minimum distance with settings in the telephoto region. Incidentally, so long as the effect is not lost, modifications may be made. For example, during focusing, the front lens subunit $2a$ may be made to move at a different speed from that of movement of the rear lens subunit $2b$. Further, an additional lens unit for correcting aberrations may be provided between the front lens subunit $2a$ and the rear lens subunit $2b$. Also, within the second lens unit, on the image side of the rear lens subunit $2b$, a lens subunit may be provided.

Another feature of the zoom lens of the invention is to satisfy the following condition:

$$0.3 < |f2a|/\sqrt{fw \times ft} < 0.9 \qquad (1)$$

where f2a: the focal length of the front lens subunit 2a, fw: the focal length at the wide-angle end of the zoom lens, and ft: the focal length at the telephoto end of the zoom lens.

The inequalities (1) are a condition for giving a range for the focal length of the front lens subunit 2a at the wide-angle end.

When the upper limit of the condition (1) is exceeded, it becomes difficult to secure a sufficient zoom ratio and, moreover, to retain the focusing sensitivity of the rear lens subunit 2b. As a result, the total focusing movement of the rear lens subunit 2b becomes too much long. When the lower limit is exceeded, it becomes difficult to correct negative distortion particularly at the wide-angle end.

For more improved results, it is preferred to alter the inequalities (1) to the following range:

$$0.45 < |f2a|/\sqrt{(fw \times ft)} < 0.75 \quad (2)$$

Further, the zoom lens of the invention is desired to satisfy even the following conditions:

$$0 < \beta 2bw < 1.0 \quad (3)$$

$$-0.8 < \beta 2bt < 0.8 \quad (4)$$

where $\beta 2bw$: the magnification of the rear lens subunit 2b at the wide-angle end, and $\beta 2bt$: the magnification of the rear lens subunit 2b at the telephoto end.

The inequalities (3) are a condition for giving a range for the magnification of the rear lens subunit 2b at the wide-angle end.

When the upper limit of the condition (3) is exceeded, as this implies that the absolute value of the magnification of the whole second lens unit in the wide-angle end is too large, it becomes difficult to shorten the focal length at the wide-angle end of the entire zoom lens. On the other hand, when the lower limit of the condition (3) is exceeded, as this implies that the negative refractive power at the wide-angle end of the whole second lens unit is too weak, the lens configuration of the retro focus type becomes objectionably hard to take.

The inequalities (4) are a condition for giving a range for the magnification of the rear lens subunit 2b at the telephoto end.

If the condition (4) is violated as follows:

$$0.8 \leq \beta 2bt \leq 1.2$$

$$-1.2 \leq \beta 2bt \leq -0.8,$$

the focusing sensitivity at the telephoto end of the rear lens subunit 2b becomes too small. In some cases, therefore, the total focusing movement is caused to increase excessively. In other cases, focusing becomes impossible. So, such violations are objectionable.

If, further deviating from the condition (4), the factor falls in the following ranges:

$$1.2 < \beta 2bt$$

$$\beta 2bt < -1.2,$$

the balance in magnification shares with the other optical system within the second lens unit becomes worse. As a result, it becomes difficult to correct curvature of field and the variation with focusing of spherical aberration. So, such violations are objectionable.

For more improved results, it is preferred to alter the inequalities (3) and (4) to the following ranges:

$$0 < \beta 2bw < 0.5 \quad (5)$$

$$-0.4 < \beta 2bt < 0.4 \quad (6)$$

Further, the zoom lens of the invention is desired to satisfy even the following conditions:

$$0.8 < f1/\sqrt{(fw \times ft)} < 2.2 \quad (7)$$

$$0.3 < |f2b|/\sqrt{(fw \times ft)} < 1.2 \quad (8)$$

where f1: the focal length of the first lens unit, and f2b: the focal length of the rear lens subunit 2b.

The inequalities (7) are a condition for giving a range for the focal length of the first lens unit.

When the upper limit of the condition (7) is exceeded, the telephoto type becomes impossible to make sufficient in the telephoto end and it becomes difficult to secure a certain F-number. On the other hand, when the lower limit is exceeded, the diameter of the front lens members increases objectionably.

The inequalities (8) are a condition for giving a range for the focal length of the rear lens subunit 2b.

When the upper limit of the condition (8) is exceeded, as this implies that the negative refractive power at the wide-angle end of the whole second lens unit is too weak, the lens configuration of the retrofocus type becomes hard to take. So, the violation is objectionable. On the other hand, when the lower limit is exceeded, the rear lens subunit 2b produces large negative spherical aberration and coma. So, the range of variation of aberrations with focusing is caused to increase objectionably.

For more improved results, it is preferred to alter the inequalities (7) and (8) to the following ranges:

$$1.1 < f1/\sqrt{(fw \times ft)} < 2.0 \quad (9)$$

$$0.45 < |f2b|/\sqrt{(fw \times ft)} < 0.95 \quad (10)$$

Also, in the zoom lens of the invention, it is preferred to satisfy even the following condition:

$$Dabw < Dabt \quad (11)$$

where

Dabw: the air separation between the front lens subunit 2a and the rear lens subunit 2b at the wide-angle end, and Dabt: the air separation between the front lens subunit 2a and the rear lens subunit 2b at the telephoto end.

The inequality (11) is a condition for determining the relation of the air separations between the front lens subunit 2a and the rear lens subunit 2b at the wide-angle end and at the telephoto end. The present invention is to make appropriate the focusing sensitivity at the telephoto end of the zoom lens. However, as the lens design is restricted by aberration correction, assurance of the zoom ratio and others, there is some possibility of occurrence of even a situation that the focusing sensitivity at the telephoto end becomes smaller than that at the wide-angle end.

When the condition (11) is satisfied, as this implies that the total focusing movement of the rear lens subunit 2b can be secured with high efficiency at the wide-angle end and the telephoto end, it becomes possible to prevent the diameter of the front lens members from increasing particularly at the wide-angle end.

Also, in the zoom lens of the invention, it is preferred that the rear lens subunit 2b includes at least one positive lens and at least two negative lenses.

In general, the lens units constituting the zoom lens are desired each to produce ever smaller aberrations in itself, but it is also possible to reduce aberrations by cancellation among the lens units.

However, concerning the focusing lens unit, if its residual aberrations are too much large, the variation of aberrations with focusing increases greatly, which is difficult to cancel out by any design of the other lens units. On this account, the negative rear lens subunit 2b is provided with at least one positive lens and at least two negative lenses, thereby producing an advantage of minimizing the variation with focusing of aberrations, especially spherical aberration and field curvature.

Further, in the zoom lens of the invention, the first lens unit comprises, in order from the longer conjugate side, a negative meniscus lens convex toward the longer conjugate side, a positive lens and a positive meniscus lens convex toward the longer conjugate side, and it is preferred to satisfy the following conditions:

$$1.6 < N1p \quad (12)$$

$$30 > v1n \quad (13)$$

where

N1p: the mean value of the refractive indices of the positive lenses in the first lens unit, and v1n: the Abbe number of the negative lens in the first lens unit.

The inequality (12) is a condition for giving a range for the mean value of the refractive indices of the positive lenses in the first lens unit.

When the condition (12) is violated, the first lens unit produces large positive spherical aberration and coma, causing deterioration of the image quality, particularly, in the telephoto end. Further, because the radii of curvature of the surfaces of these lenses become smaller, the thickness of the first lens unit increases largely. As a result, the size of the entire zoom lens is increased objectionably.

The inequality (13) is a condition for giving a range for the Abbe number of the negative lens in the first lens unit.

When the condition (13) is violated, it becomes difficult to correct longitudinal chromatic aberration, particularly, in the telephoto end.

For more improved results, it is preferred to alter the inequalities (12) and (13) to the following ranges:

$$1.65 < N1p \quad (14)$$

$$27 > v1n \quad (15)$$

If the zoom lens is designed based on the features described above, a good optical performance is achieved, while still making it easy to improve the compact form of the entire optical system, simplify the structure of the mounting mechanism for the focusing lens unit, and reduce the production cost. Moreover, even when focusing is performed onto an object at the minimum distance, the amount of movement of the focusing lens unit does not increase extremely.

Figure 14:
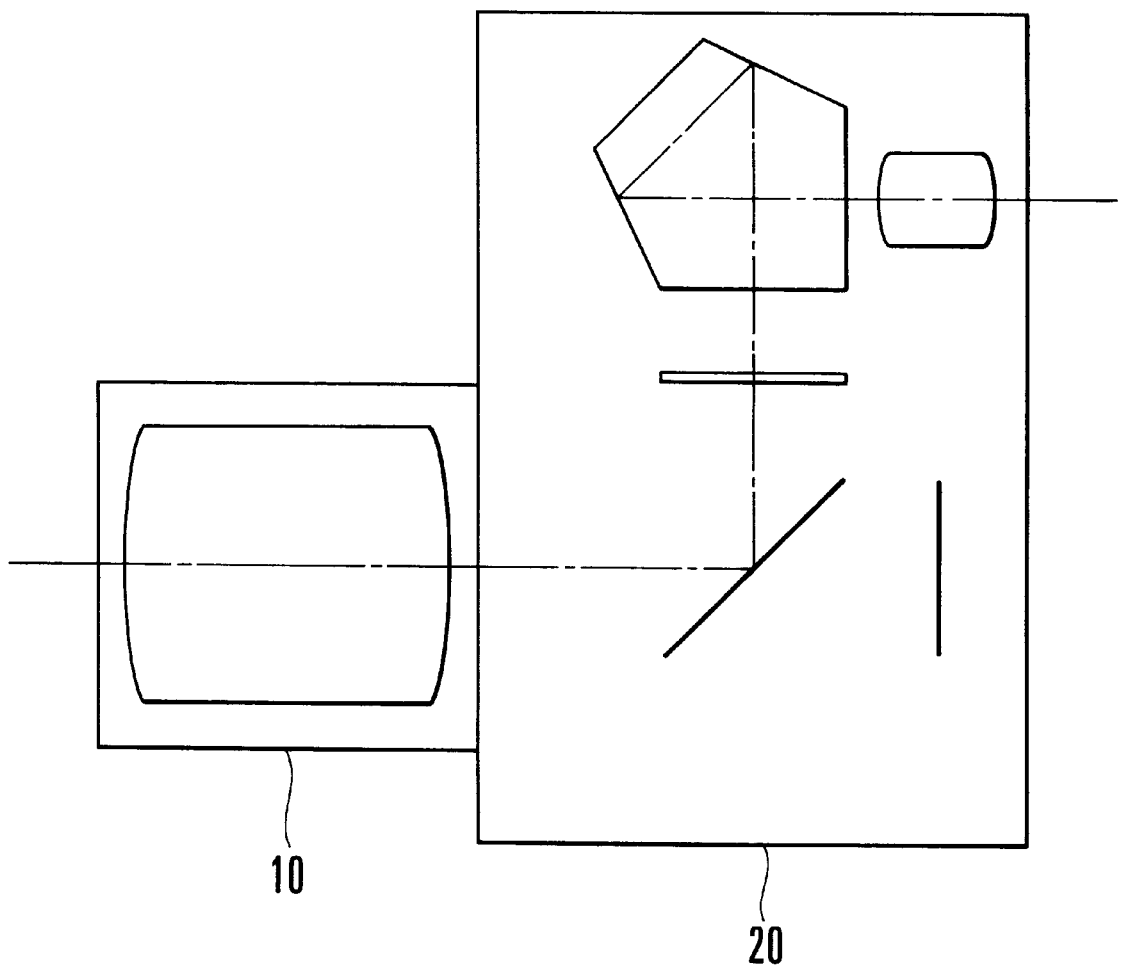
FIG. 14 is a schematic block diagram of the main parts of a single-lens reflex camera provided with the zoom lens of the invention.

FIG. 14 shows a single-lens reflex camera as an example of the optical apparatus using the zoom lens of the invention. In FIG. 14, the zoom lens 10 of the invention is releasably attached to a camera body 20. Thus, the zoom lens of the invention is suited to be used in the single-lens reflex camera, the video camera, or like optical apparatus.

Next, numerical examples of the zoom lens of the invention are described.

FIG. 1 in block diagram shows a numerical example 1 of the zoom lens, which comprises a positive first lens unit L1, a negative second lens unit L2 including a negative front lens subunit 2a and a negative rear lens subunit 2b, a stop SP, a positive third lens unit L3, a movable flare cutter FP, a negative fourth lens unit L4 and a positive fifth lens unit L5 arranged in this order from the longer conjugate side. In FIG. 1, the left side is the object side (longer conjugate side), and IP stands for the image plane.

In the numerical example 1, during zooming from the wide-angle end W to the telephoto end T, the first lens unit L1 moves toward the object side, the front lens subunit 2a moves toward the object side while increasing the separation between the first lens unit L1 and the first lens subunit 2a, the rear lens subunit 2b moves toward the image side while increasing the separation between the front lens subunit 2a and the rear lens subunit 2b, the third lens unit L3 moves toward the object side while decreasing the separation between the rear lens subunit 2b and the third lens unit L3, the fourth lens unit L4 remains stationary, and the fifth lens unit L5 moves toward the object side integrally with the third lens unit L3 while decreasing the separation between the fourth lens unit L4 and the fifth lens unit L5. The rear lens subunit 2b is a focusing lens unit, which moves toward the object side during focusing from an infinitely distant object to an object at the minimum distance.

Figure 2:
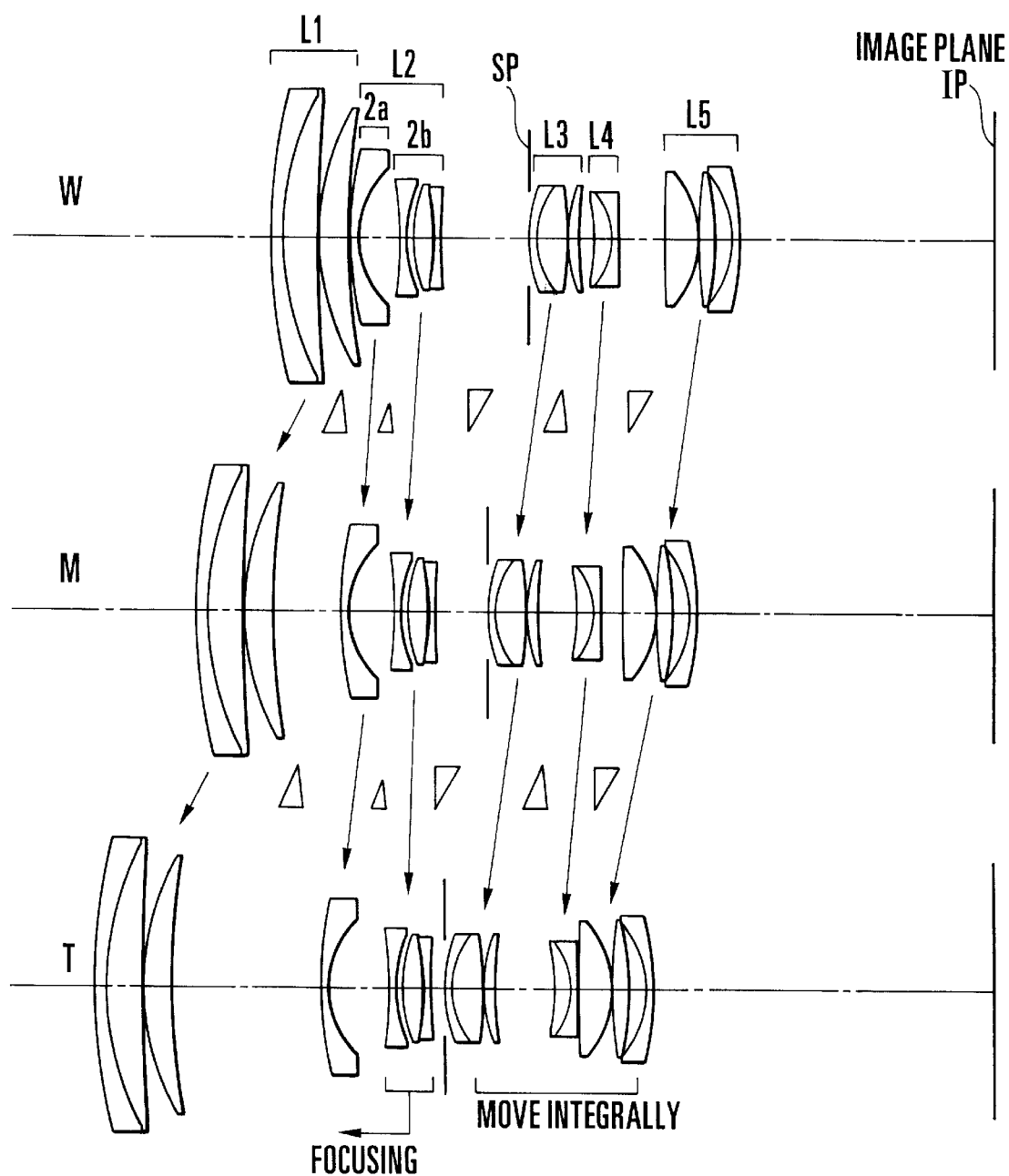
FIG. 2 is a longitudinal section view of a numerical example 2 of the zoom lens of the invention in three operative positions.

FIG. 2 in block diagram shows a numerical example 2 of the zoom lens, which comprises a positive first lens unit L1, a negative second lens unit L2 including a negative front lens subunit 2a and a negative rear lens subunit 2b, a stop SP, a positive third lens unit L3, a negative fourth lens unit L4 and a positive fifth lens unit L5 arranged in this order from the longer conjugate side. IP stands for the image plane.

In the numerical example 2, during zooming from the wide-angle end W to the telephoto end W, the first lens unit L1 moves toward the object side, the front lens subunit 2a moves toward the object side while increasing the separation between the first lens unit L1 and the front lens subunit 2a, the rear lens subunit 2b moves toward the object side while increasing the separation between the front lens subunit 2a and the rear lens subunit 2b, the third lens unit L3 moves toward the object side while decreasing the separation between the rear lens subunit 2b and the third lens unit L3, the fourth lens unit L4 moves toward the object side while increasing the separation between the third lens unit L3 and the fourth lens unit L4, and the fifth lens unit L5 moves toward the object side integrally with the third lens unit L3 while decreasing the separation between the fourth lens unit L4 and the fifth lens unit L5. The rear lens subunit 2b is a focusing lens unit, which moves toward the object side during focusing from an infinitely distant object to an object at the minimum distance.

Figure 3:
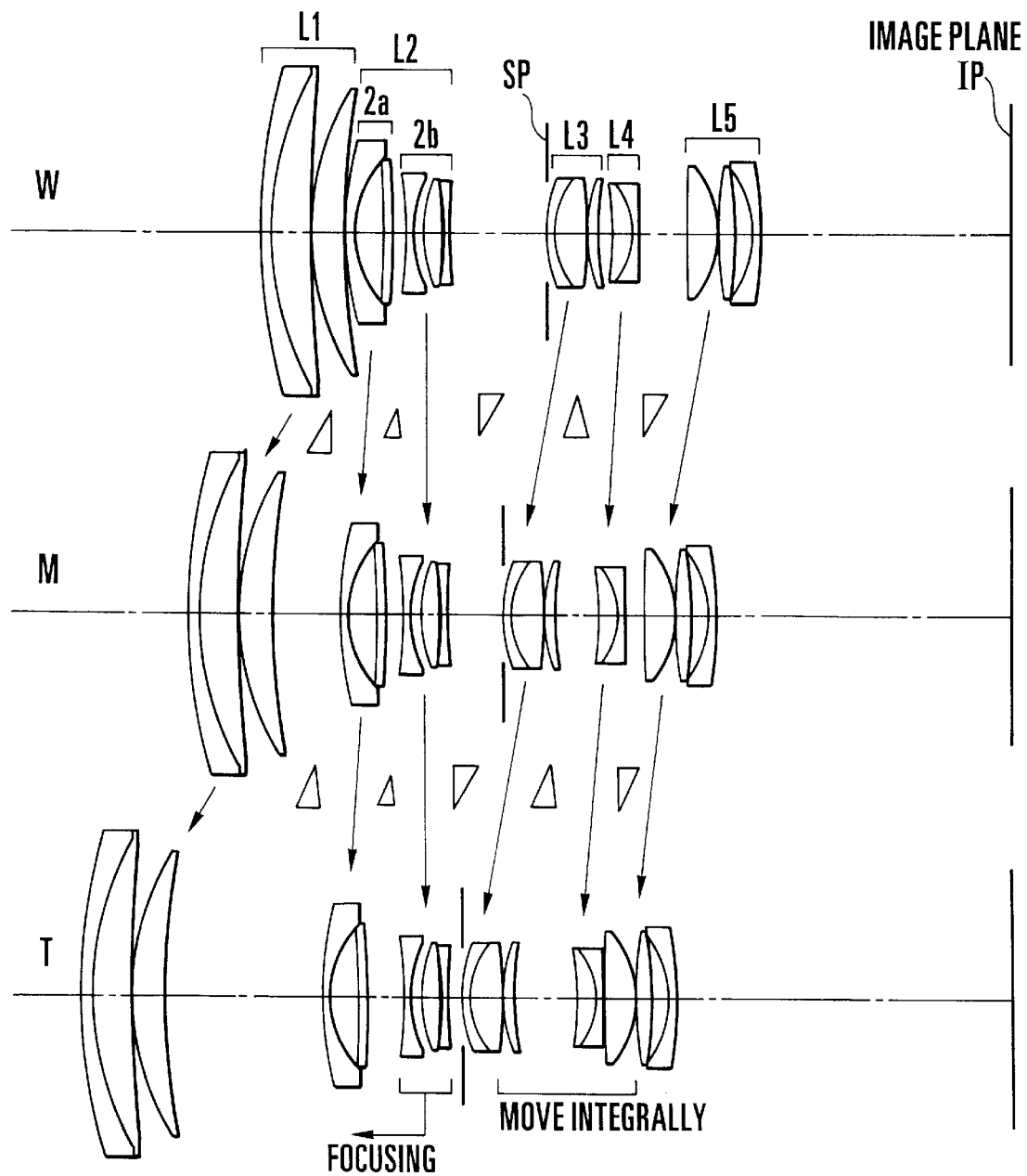
FIG. 3 is a longitudinal section view of a numerical example 3 of the zoom lens of the invention in three operative positions.

FIG. 3 in block diagram shows a numerical example 3 of the zoom lens, which comprises a positive first lens unit L1, a negative second lens unit L2 including a negative front lens subunit 2a and a negative rear lens subunit 2b, a stop SP, a positive third lens unit L3, a negative fourth lens unit L4 and a positive fifth lens unit L5 arranged in this order from the longer conjugate side. IP stands for the image plane.

In the numerical example 3, during zooming from the wide-angle end W to the telephoto end T, the first lens unit L1 moves toward the object side, the front lens subunit 2a moves toward the object side while increasing the separation between the first lens unit L1 and the front lens subunit 2a, the rear lens subunit 2b moves toward the object side while increasing the separation between the front lens subunit 2a and the rear lens subunit 2b, the third lens unit L3 moves toward the object side while decreasing the separation between the rear lens subunit 2b and the third lens unit L3, the fourth lens unit L4 moves toward the object side while increasing the separation between the third lens unit L3 and the fourth lens unit L4, and the fifth lens unit L5 moves toward the object side integrally with the third lens unit L3 while decreasing the separation between the fourth lens unit L4 and the fifth lens unit L5. The rear lens subunit 2b is a focusing lens unit, which moves toward the object side during focusing from an infinitely distant object to an object at the minimum distance.

FIG. 4 in block diagram shows a numerical example 4 of the zoom lens, which comprises a positive first lens unit L1, a negative second lens unit L2 including a negative front lens subunit 2a and a negative rear lens subunit 2b, a stop SP, a positive third lens unit L3 and a positive fourth lens unit L4 arranged in this order from the longer conjugate side. IP stands for the image plane.

In the numerical example 4, during zooming from the wide-angle end W to the telephoto end T, the first lens unit L1 moves toward the object side, the front lens subunit 2a moves toward the object side while increasing the separation between the first lens unit L1 and the front lens subunit 2a, the rear lens subunit 2b moves toward the object side while increasing the separation between the front lens subunit 2a and the rear lens subunit 2b, the third lens unit L3 moves toward the object side while decreasing the separation between the rear lens subunit 2b and the third lens unit L3, and the fourth lens unit L4 moves toward the object side while decreasing the separation between the third lens unit L3 and the fourth lens unit L4. The rear lens subunit 2b is a focusing lens unit, which moves toward the object side during focusing from an infinitely distant object to an object at the minimum distance.

Next, numerical data of the numerical examples 1 to 4 of the invention are shown. In the numerical data of the examples 1 to 4, Ri is the radius of curvature of the i-th lens surface, when counted from the object side, Di is the i-th lens thickness or air separation, when counted from the object side, and Ni and νi are respectively the refractive index and Abbe number of the material of the i-th lens element, when counted from the object side.

The shape of an aspheric surface is expressed in the coordinates with an X axis in the axial direction and an H axis in the direction perpendicular to an optical axis, an original point being put at the cross point of the lens surface with the optical axis and the direction in which light advances being taken as positive, by the following equation:

$$X = \frac{(1/R)H^2}{1 + \sqrt{1 - (H/R)^2}} + AH^2 + BH^4 + CH^6 + DH^8 + EH^{10}$$

where R is the radius of the osculating sphere, and A, B, C, D and E are the aspheric coefficients.

The values of the factors in the above-described conditions for the numerical examples 1 to 4 are listed in Table-1.

Numerical Example 1

| f = 24.84~82.02 | Fno = 3.47~4.68 | 2ω = 82.1~29.6 | |
|---|---|---|---|
| R1 = 95.853 | D1 = 1.20 | N1 = 1.846660 | ν1 = 23.8 |
| R2 = 51.760 | D2 = 6.68 | N2 = 1.696797 | ν2 = 55.5 |
| R3 = 236.312 | D3 = 0.12 | | |
| R4 = 47.155 | D4 = 4.95 | N3 = 1.696797 | ν3 = 55.5 |
| R5 = 117.353 | D5 = Variable | | |
| R6 = 65.414 | D6 = 1.40 | N4 = 1.772499 | ν4 = 49.6 |
| R7 = 16.105 | D7 = Variable | | |
| *R8 = −199.205 | D8 = 1.00 | N5 = 1.772499 | ν4 = 49.6 |
| R9 = 19.068 | D9 = 1.78 | | |
| R10 = 21.697 | D10 = 2.75 | N6 = 1.805181 | ν6 = 25.4 |
| R11 = 481.337 | D11 = 0.53 | | |
| R12 = −84.230 | D12 = 0.80 | N7 = 1.804000 | ν7 = 46.6 |
| R13 = 102.399 | D13 = Variable | | |
| R14 = Stop | D14 = 0.20 | | |
| R15 = 23.927 | D15 = 0.80 | N8 = 1.846660 | ν8 = 23.8 |
| R16 = 15.302 | D16 = 3.77 | N9 = 1.487490 | ν9 = 70.2 |
| R17 = −60.230 | D17 = 0.10 | | |
| R18 = 30.012 | D18 = 2.18 | N10 = 1.712995 | ν10 = 53.8 |
| R19 = −416.888 | D19 = Variable | | |
| R20 = Flare Cutter | D20 = Variable | | |
| R21 = −41.554 | D21 = 2.41 | N11 = 1.846660 | ν11 = 23.8 |
| R22 = −15.258 | D22 = 0.19 | | |
| R23 = −14.437 | D23 = 0.80 | N12 = 1.806098 | ν12 = 41.0 |
| R24 = 141.752 | D24 = Variable | | |
| R25 = −425.228 | D25 = 4.92 | N13 = 1.487490 | ν13 = 70.2 |
| R26 = −17.401 | D26 = 0.12 | | |
| R27 = 62.084 | D27 = 3.47 | N14 = 1.772499 | ν14 = 49.6 |
| R28 = −46.077 | D28 = 1.94 | | |
| R29 = −20.614 | D29 = 1.10 | N15 = 1.846658 | ν15 = 23.9 |
| R30 = −143.561 | | | |

| Variable | Focal Length | | |
|---|---|---|---|
| Separation | 24.84 | 50.53 | 82.02 |
| D5 | 0.50 | 16.37 | 27.88 |
| D7 | 5.38 | 7.17 | 8.63 |
| D13 | 12.88 | 5.13 | 1.26 |
| D19 | 0.40 | 2.86 | 6.22 |
| D20 | 0.91 | 4.91 | 4.91 |
| D24 | 10.37 | 3.91 | 0.55 |

Aspheric Coefficients

R8: A = 0.00000e+00  B = 4.49838e−06  C = −1.81594e−07
    D = 5.94760e−09  E = −9.53007e−11

Numerical Example 2

| f = 28.90~101.58 | Fno = 3.57~4.67 | 2ω = 73.62~24.1 | |
|---|---|---|---|
| R1 = 102.026 | D1 = 2.00 | N1 = 1.846659 | ν1 = 23.8 |
| R2 = 51.893 | D2 = 6.04 | N2 = 1.696797 | ν2 = 55.5 |
| R3 = 424.300 | D3 = 0.12 | | |
| R4 = 44.599 | D4 = 4.78 | N3 = 1.696797 | ν3 = 55.5 |
| R5 = 129.757 | D5 = Variable | | |
| R6 = 66.293 | D6 = 1.20 | N4 = 1.712995 | ν4 = 53.8 |
| R7 = 15.769 | D7 = Variable | | |
| R8 = −66.529 | D8 = 1.10 | N5 = 1.882997 | ν5 = 40.8 |
| R9 = 24.176 | D9 = 1.13 | | |
| R10 = 24.357 | D10 = 3.26 | N6 = 1.846658 | ν6 = 23.9 |
| R11 = −53.985 | D11 = 0.35 | | |

-continued f = 28.90~101.58   Fno = 3.57~4.67   2ω = 73.62~24.1

| | | | | |
|---|---|---|---|---|
| R12 = | −38.850 | D12 = 1.10 | N7 = 1.834000 | ν7 = 37.2 |
| R13 = | 112.860 | D13 = Variable | | |
| R14 = | Stop | D14 = 0.00 | | |
| R15 = | 24.496 | D15 = 1.20 | N8 = 1.846659 | ν8 = 23.8 |
| R16 = | 13.997 | D16 = 5.42 | N9 = 1.603112 | ν9 = 60.7 |
| R17 = | −66.163 | D17 = 0.12 | | |
| R18 = | 28.916 | D18 = 1.86 | N10 = 1.772499 | ν10 = 49.6 |
| R19 = | 61.152 | D19 = Variable | | |
| R20 = | −39.670 | D20 = 2.92 | N11 = 1.755199 | ν11 = 27.5 |
| R21 = | −12.463 | D21 = 1.10 | N12 = 1.804000 | ν12 = 46.6 |
| R22 = | −564.896 | D22 = Variable | | |
| R23 = | 206.930 | D23 = 5.62 | N13 = 1.487490 | ν13 = 70.2 |
| R24 = | −18.031 | D24 = 0.12 | | |
| R25 = | 86.970 | D25 = 2.65 | N14 = 1.696797 | ν14 = 55.5 |
| R26 = | −67.777 | D26 = 2.81 | | |
| R27 = | −18.100 | D27 = 1.40 | N15 = 1.846659 | ν15 = 23.8 |
| R28 = | −49.826 | | | |

| Variable | Focal Length | | |
|---|---|---|---|
| Separation | 28.90 | 50.00 | 101.58 |
| D5 | 0.50 | 11.27 | 24.99 |
| D7 | 6.87 | 7.74 | 10.17 |
| D13 | 14.94 | 8.77 | 2.29 |
| D19 | 2.58 | 6.69 | 10.13 |
| D22 | 7.70 | 3.59 | 0.15 |

Numerical Example 3 f = 28.90~101.53   Fno = 3.63~4.67   2ω = 73.6~24.1

| | | | | |
|---|---|---|---|---|
| R1 = | 97.387 | D1 = 2.00 | N1 = 1.846659 | ν1 = 23.8 |
| R2 = | 53.704 | D2 = 6.45 | N2 = 1.696797 | ν2 = 55.5 |
| R3 = | 285.841 | D3 = 0.12 | | |
| R4 = | 45.288 | D4 = 5.50 | N3 = 1.696797 | ν3 = 55.5 |
| R5 = | 133.190 | D5 = Variable | | |
| R6 = | 67.158 | D6 = 1.20 | N4 = 1.804000 | ν4 = 46.6 |
| R7 = | 17.316 | D7 = 4.75 | | |
| R8 = | −214.243 | D8 = 1.50 | N5 = 1.698947 | ν5 = 30.1 |
| R9 = | −142.144 | D9 = Variable | | |
| R10 = | −65.466 | D10 = 1.10 | N6 = 1.882997 | ν6 = 40.8 |
| R11 = | 22.588 | D11 = 1.72 | | |
| R12 = | 25.191 | D12 = 2.99 | N7 = 1.646658 | ν7 = 23.9 |
| R13 = | −81.927 | D13 = 0.36 | | |
| R14 = | −50.106 | D14 = 1.10 | N8 = 1.806098 | ν8 = 41.0 |
| R15 = | 155.874 | D15 = Variable | | |
| R15 = | Stop | D16 = 0.00 | | |
| R17 = | 25.211 | D17 = 1.20 | N9 = 1.846659 | ν9 = 23.8 |
| R18 = | 13.902 | D18 = 5.41 | N10 = 1.603112 | ν10 = 60.7 |
| R19 = | −71.675 | D19 = 0.12 | | |
| R20 = | 28.195 | D20 = 1.75 | N11 = 1.772499 | ν11 = 49.6 |
| R21 = | 54.525 | D21 = Variable | | |
| R22 = | −53.616 | D22 = 3.21 | N12 = 1.755199 | ν12 = 27.5 |
| R23 = | −12.463 | D23 = 1.10 | N13 = 1.804000 | ν13 = 46.6 |
| R24 = | −632.315 | D24 = Variable | | |
| R25 = | 304.344 | D25 = 5.06 | N14 = 1.487490 | ν14 = 70.2 |
| R26 = | −18.198 | D26 = 0.12 | | |
| R27 = | 72.084 | D27 = 2.66 | N15 = 1.696797 | ν15 = 55.5 |
| R28 = | −69.699 | D28 = 2.75 | | |
| R29 = | −18.477 | D29 = 1.40 | N16 = 1.846659 | ν16 = 23.8 |
| R30 = | −74.753 | | | |

| Variable | Focal Length | | |
|---|---|---|---|
| Separation | 28.90 | 50.00 | 101.53 |
| D5 | 0.50 | 11.26 | 26.01 |
| D9 | 2.21 | 2.91 | 5.87 |
| D15 | 15.52 | 8.99 | 2.26 |
| D21 | 2.31 | 7.14 | 10.18 |
| D24 | 8.12 | 3.29 | 0.25 |

Numerical Example 4 f = 29.00~100.53   Fno = 3.45~4.65   2ω = 73.5~24.3

| | | | | |
|---|---|---|---|---|
| R1 = | 70.805 | D1 = 1.70 | N1 = 1.846659 | ν1 = 23.8 |
| R2 = | 42.561 | D2 = 7.99 | N2 = 1.696797 | ν2 = 55.5 |
| R3 = | 170.878 | D3 = 0.10 | | |
| R4 = | 56.638 | D4 = 4.92 | N3 = 1.696797 | ν3 = 55.5 |
| R5 = | 179.665 | D5 = Variable | | |
| *R6 = | 68.405 | D6 = 1.50 | N4 = 1.804000 | ν4 = 46.6 |
| R7 = | 16.581 | D7 = 4.65 | | |
| R8 = | 1611.036 | D8 = 1.55 | N5 = 1.805181 | ν5 = 25.4 |
| R9 = | −120.905 | D9 = Variable | | |
| R10 = | −51.179 | D10 = 1.00 | N6 = 1.804000 | ν6 = 46.6 |
| R11 = | 25.714 | D11 = 0.45 | | |
| R12 = | 23.010 | D12 = 2.93 | N7 = 1.805181 | ν7 = 25.4 |
| R13 = | −127.838 | D13 = 0.73 | | |
| R14 = | −35.068 | D14 = 0.80 | N8 = 1.772499 | ν8 = 49.6 |
| R15 = | 174.407 | D15 = Variable | | |
| R16 = | Stop | D16 = 0.30 | | |
| R17 = | 211.934 | D17 = 1.55 | N9 = 1.603112 | ν9 = 60.7 |
| R18 = | −96.893 | D18 = 0.22 | | |
| R19 = | 22.077 | D19 = 4.88 | N10 = 1.696797 | ν10 = 55.5 |
| R20 = | −37.091 | D20 = 0.37 | | |
| R21 = | −26.587 | D21 = 3.94 | N11 = 1.800999 | ν11 = 35.0 |
| R22 = | 132.289 | D22 = Variable | | |
| R23 = | 67.196 | D23 = 5.90 | N12 = 1.583126 | ν12 = 59.4 |
| *R24 = | −19.777 | D24 = 3.56 | | |
| R25 = | −13.582 | D25 = 1.29 | N13 = 1.805181 | ν13 = 25.4 |
| R26 = | −20.431 | | | |

| Variable | Focal Length | | |
|---|---|---|---|
| Separation | 29.00 | 49.99 | 100.53 |
| D5 | 0.50 | 11.41 | 26.87 |
| D9 | 2.06 | 3.46 | 5.33 |
| D15 | 14.02 | 7.50 | 1.65 |
| D22 | 10.23 | 8.37 | 7.18 |

Aspheric Coefficients

| R6: | A = 0.00000e+00 | B = 1.40664e-06 | C = -2.16669e-09 |
|---|---|---|---|
|  | D = 6.23480e-12 | E = 0.00000e+00 |  |
| R24: | A = 0.00000e+00 | B = 3.84723e-06 | C = -3.92884e-08 |
|  | D = 3.96369e-10 | E = -4.61841e-12 |  |

TABLE 1

| Condition | Numerical Example | | | |
|---|---|---|---|---|
| Factor | 1 | 2 | 3 | 4 |
| $|f2a|/\sqrt{(fw \times ft)}$ | 0.620 | 0.541 | 0.577 | 0.667 |
| $\beta 2bw$ | 0.438 | 0.372 | 0.267 | 0.342 |
| $\beta 2bt$ | 0.341 | 0.223 | 0.125 | 0.182 |
| $f1/\sqrt{(fw \times ft)}$ | 1.851 | 1.310 | 1.347 | 1.449 |
| $|f2b|/\sqrt{(fw \times ft)}$ | 0.879 | 0.672 | 0.651 | 0.570 |
| N1p | 1.697 | 1.697 | 1.697 | 1.697 |
| v1n | 23.800 | 23.800 | 23.800 | 23.800 |

FIGS. 5A1 to 5A4, 5B1 to 5B4 and 5C1 to 5C4 and FIGS. 6A1 to 6A4, 6B1 to 6B4 and 6C1 to 6C4 graphically show the aberrations of the numerical example 1 of the zoom lens of the invention. FIGS. 7A1 to 7A4, 7B1 to 7B4 and 7C1 to 7C4 and FIGS. 8A1 to 8A4, 8B1 to 8B4 and 8C1 to 8C4 graphically show the aberrations of the numerical example 2 of the zoom lens of the invention. FIGS. 9A1 to 9A4, 9B1 to 9B4 and 9C1 to 9C4 and Figs. 10A1 to 10A4, 10B1 to 10B4 and 10C1 to 10C4 graphically show the aberrations of the numerical example 3 of the zoom lens of the invention. FIGS. 11A1 to 11A4, 11B1 to 11B4 and 11C1 to 11C4 and FIGS. 12A1 to 12A4, 12B1 to 12B4 and 12C1 to 12C4 graphically show the aberrations of the numerical example 4 of the zoom lens of the invention.

In these figures, the aberration curves labeled W are in the wide-angle end, the ones labeled M in a middle focal length position and the ones labeled T at the telephoto end. FIGS. 5A1 to 5A4, 5B1 to 5B4 and 5C1 to 5C4, FIGS. 7A1 to 7A4, 7B1 to 7B4 and 7C1 to 7C4, FIGS. 9A1 to 9A4, 9B1 to 9B4 and 9C1 to 9C4, and FIGS. 11A1 to 11A4, 11B1 to 11B4 and 11C1 to 11C4 are diagrams of aberrations obtained when the object distance is infinite. FIGS. 6A1 to 6A4, 6B1 to 6B4 and 6C1 to 6C4, FIGS. 8A1 to 8A4, 8B1 to 8B4 and 8C1 to 8C4, FIGS. 10A1 to 10A4, 10B1 to 10B4 and 10C1 to 10C4 and FIGS. 12A1 to 12A4, 12B1 to 12B4 and 12C1 to 12C4 are diagrams of aberrations obtained when the object distance is short.

In the graphs representing the spherical aberrations, the solid line is for the spectral d-line, the 2-dot dash line for the spectral g-line, the dashed line for the sine condition. In the graphs representing the astigmatism, the solid line is for the sagittal image surface and the dot line for the meridional image surface.

As described above, according to the embodiments, the distance the focusing lens unit moves during focusing does not increase extremely. It is, therefore, possible to provide a compact zoom lens and an optical apparatus having the same.

What is claimed is:

1. A zoom lens comprising, in order from a longer conjugate side to a shorter conjugate side, a first lens unit of positive refractive power, a second lens unit of negative refractive power, and a succeeding lens group which is composed of a plurality of lens units or one lens unit and whose overall refractive power is positive, wherein, during zooming from a wide-angle end to a telephoto end, the separation between said first lens unit and said second lens unit increases and the separation between said second lens unit and said succeeding lens group decreases, and wherein said second lens unit includes a front lens subunit of negative refractive power and a rear lens subunit of negative refractive power disposed on the shorter conjugate side of said front lens subunit, focusing being performed by moving said rear lens subunit, and the following condition being satisfied:

$$0.3 < |f2a|/\sqrt{(fw \times ft)} < 0.9$$

where fw and ft are focal lengths at the wide-angle end and the telephoto end of said zoom lens, respectively, and f2a is a focal length of said front lens subunit, and wherein said first lens unit moves during zooming.

2. A zoom lens comprising, in order from a longer conjugate side to a shorter conjugate side, a first lens unit of positive refractive power, a second lens unit of negative refractive power, and a succeeding lens group which is composed of a plurality of lens units or one lens unit and whose overall refractive power is positive, wherein, during zooming from a wide-angle end to a telephoto end, the separation between said first lens unit and said second lens unit increases and the separation between said second lens unit and said succeeding lens group decreases, and wherein said second lens unit includes a front lens subunit of negative refractive power and a rear lens subunit of negative refractive power disposed on the shorter conjugate side of said front lens subunit, focusing being performed by moving said rear lens subunit, and the following condition being satisfied:

$$0.3 < |f2a|/\sqrt{(fw \times ft)} < 0.9$$

where fw and ft are focal lengths at the wide-angle end and the telephoto end of said zoom lens, respectively, and f2a is a focal length of said front lens subunit, and further satisfying the following conditions:

$$0 < \beta 2bw < 1.0$$

$$-0.8 < \beta 2bt < 0.8$$

where $\beta 2bw$ is the magnification of said rear lens subunit at the wide-angle, and $\beta 2bt$ is the magnification of said rear lens subunit at the telephoto end.

3. A zoom lens comprising, in order from a longer conjugate side to a shorter conjugate side, a first lens unit of positive refractive power, a second lens unit of negative refractive power, and a succeeding lens group which is composed of a plurality of lens units or one lens unit and whose overall refractive power is positive, wherein, during zooming from a wide-angle end to a telephoto end, the separation between said first lens unit and said second lens unit increases and the separation between said second lens unit and said succeeding lens group decreases, and wherein said second lens unit includes a front lens subunit of negative refractive power and a rear lens subunit of negative refractive power disposed on the shorter conjugate side of said front lens subunit, focusing being performed by moving said rear lens subunit, and the following condition being satisfied:

$$0.3<|f2a|/\sqrt{(fw \times ft)}<0.9$$

where fw and ft are focal lengths at the wide-angle end and the telephoto end of said zoom lens, respectively, and f2a is a focal length of said front lens subunit, and further satisfying the following conditions:

$$0.8<f1/\sqrt{(fw \times ft)}<2.2$$

$$0.3<|f2b|/\sqrt{(fw \times ft)}<1.2$$

where f1 is a focal length of said first lens unit, and f2b is a focal length of said rear lens subunit.

4. A zoom lens comprising, in order from a longer conjugate side to a shorter conjugate side, a first lens unit of positive refractive power, a second lens unit of negative refractive power, and a succeeding lens group which is composed of a plurality of lens units or one lens unit and whose overall refractive power is positive, wherein, during zooming from a wide-angle end to a telephoto end, the separation between said first lens unit and said second lens unit increases and the separation between said second lens unit and said succeeding lens group decreases, and wherein said second lens unit includes a front lens subunit of negative refractive power and a rear lens subunit of negative refractive power disposed on the shorter conjugate side of said front lens subunit, focusing being performed by moving said rear lens subunit, and the following condition being satisfied:

$$0.3<|f2a|/\sqrt{(fw \times ft)}<0.9$$

where fw and ft are focal lengths at the wide-angle end and the telephoto end of said zoom lens, respectively, and f2a is a focal length of said front lens subunit, and further satisfying the following condition:

Dabw<Dabt where Dabw is the air separation between said front lens subunit and said rear lens subunit at the wide-angle end, and Dabt is the air separation between said front lens subunit and said rear lens subunit at the telephoto end.

5. A zoom lens comprising, in order from a longer conjugate side to a shorter conjugate side, a first lens unit of positive refractive power, a second lens unit of negative refractive power, and a succeeding lens group which is composed of a plurality of lens units or one lens unit and whose overall refractive power is positive, wherein, during zooming from a wide-angle end to a telephoto end, the separation between said first lens unit and said second lens unit increases and the separation between said second lens unit and said succeeding lens group decreases, and wherein said second lens unit includes a front lens subunit of negative refractive power and a rear lens subunit of negative refractive power disposed on the shorter conjugate side of said front lens subunit, focusing being performed by moving said rear lens subunit, and the following condition being satisfied:

$$0.3<|f2a|/\sqrt{(fw \times ft)}<0.9$$

where fw and ft are focal lengths at the wide-angle end and the telephoto end of said zoom lens, respectively, and f2a is a focal length of said front lens subunit, and wherein said rear lens subunit includes at least one positive lens and at least two negative lenses.

6. A zoom lens comprising, in order from a longer conjugate side to a shorter conjugate side, a first lens unit of positive refractive power, a second lens unit of negative refractive power, and a succeeding lens group which is composed of a plurality of lens units or one lens unit and whose overall refractive power is positive, wherein, during zooming from a wide-angle end to a telephoto end, the separation between said first lens unit and said second lens unit increases and the separation between said second lens unit and said succeeding lens group decreases, and wherein said second lens unit includes a front lens subunit of negative refractive power and a rear lens subunit of negative refractive power disposed on the shorter conjugate side of said front lens subunit, focusing being performed by moving said rear lens subunit, and the following condition being satisfied:

$$0.3<|f2a|/\sqrt{(fw \times ft)}<0.9$$

where fw and ft are focal lengths at the wide-angle end and the telephoto end of said zoom lens, respectively, and f2a is a focal length of said front lens subunit, and wherein said first lens unit comprises, in order from the longer conjugate side to the shorter conjugate side, a negative meniscus lens convex toward the longer conjugate side, a positive lens and a positive meniscus lens convex toward the longer conjugate side, and satisfies the following conditions:

$$1.6<N1p$$

$$30>\nu1n$$

wherein N1p is a mean value of refractive indices of the positive lenses in said first lens unit, and ν1n is an Abbe number of the negative lens in said first lens unit.

7. An optical apparatus comprising a zoom lens according to one of claims 1 to 6.

* * * * *

UNITED STATES PATENT AND TRADEMARK OFFICE
CERTIFICATE OF CORRECTION

PATENT NO.    : 6,236,516 B1
DATED         : May 22, 2001
INVENTOR(S)   : Makoto Misaka It is certified that error appears in the above-identified patent and that said Letters Patent is hereby corrected as shown below:

Column 10,
Line 12, "v4" should read -- v5 --.

Column 11,
Line 53, "R15 = Stop" should read -- R16 = Stop --.

Signed and Sealed this

Fourth Day of June, 2002

Attest:

Attesting Officer

JAMES E. ROGAN
Director of the United States Patent and Trademark Office